United States Patent
Shintani

(10) Patent No.: US 8,405,745 B2
(45) Date of Patent: Mar. 26, 2013

(54) IMAGE PROCESSING APPARATUS, IMAGE PROCESSING METHOD, AND PROGRAM

(75) Inventor: Takuya Shintani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 598 days.

(21) Appl. No.: 12/553,817

(22) Filed: Sep. 3, 2009

(65) Prior Publication Data

US 2010/0074597 A1    Mar. 25, 2010

(30) Foreign Application Priority Data

Sep. 24, 2008    (JP) ................................ 2008-244943

(51) Int. Cl.
*H04N 5/76* (2006.01)
*H04N 5/217* (2011.01)

(52) U.S. Cl. ..................................... 348/241; 348/231.3

(58) Field of Classification Search ............. 348/231.99, 348/231.3, 231.6, 241
See application file for complete search history.

(56) References Cited

U.S. PATENT DOCUMENTS

| | | | |
|---|---|---|---|
| 6,940,550 B2 * | 9/2005 | Kitawaki et al. ............. | 348/246 |
| 7,365,788 B2 | 4/2008 | Ito | |
| 7,991,241 B2 * | 8/2011 | Kusama ......................... | 382/254 |
| 8,089,536 B2 * | 1/2012 | Kotani ........................... | 348/246 |
| 2010/0053357 A1 * | 3/2010 | Ikeda ......................... | 348/222.1 |

FOREIGN PATENT DOCUMENTS

| | | |
|---|---|---|
| JP | 06-105241 | 4/1994 |
| JP | 2001-223894 | 8/2001 |
| JP | 2003-289495 | 10/2003 |
| JP | 2004-242158 | 8/2004 |
| WO | WO 9937087 A1 * | 7/1999 |

* cited by examiner

*Primary Examiner* — Timothy J Henn
(74) *Attorney, Agent, or Firm* — Cowan, Liebowitz & Latman, P.C.

(57) ABSTRACT

An image processing apparatus comprising: a foreign substance information acquisition unit which acquires, from input moving image data, foreign substance information containing a position and size of a foreign substance adhering to an optical element arranged in front of an image sensor in an image capturing apparatus that captures the moving image data; a motion vector information acquisition unit which acquires, from the moving image data, a motion vector of a macroblock obtained by dividing the moving image data; a correction playback unit which corrects deterioration of image quality caused by the foreign substance, based on the foreign substance information, and plays back moving image data; and a determination unit which determines, based on a motion vector of a macroblock matching the position of the foreign substance in the moving image data to be played back, whether to perform foreign substance correction playback of the macroblock.

20 Claims, 21 Drawing Sheets

FIG. 2
SCHEMATIC VIEW OF MACROBLOCKS
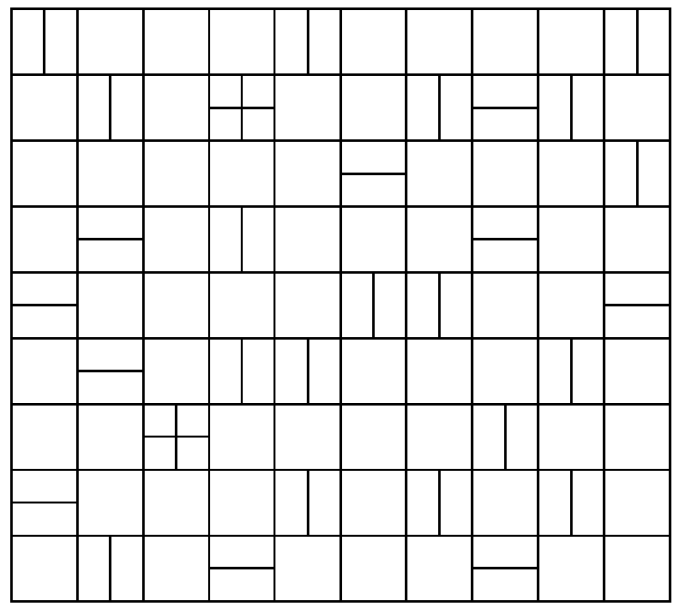
FIG. 3
Macroblock Partitions
16 × 16    16 × 8    8 × 16    8 × 8
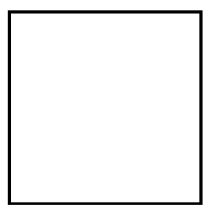 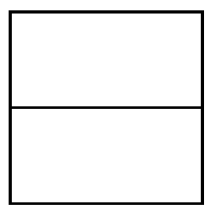 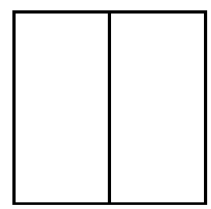 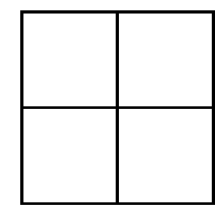
Sub-macroblock Partitions
8 × 8    8 × 4    4 × 8    4 × 4
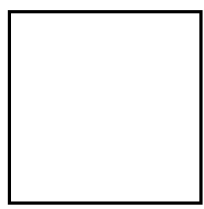 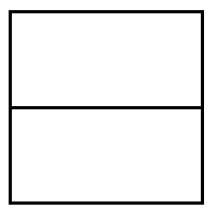 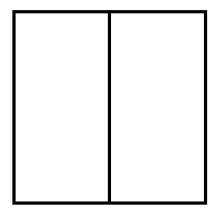 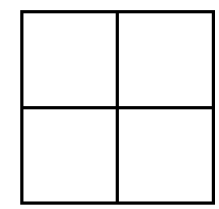

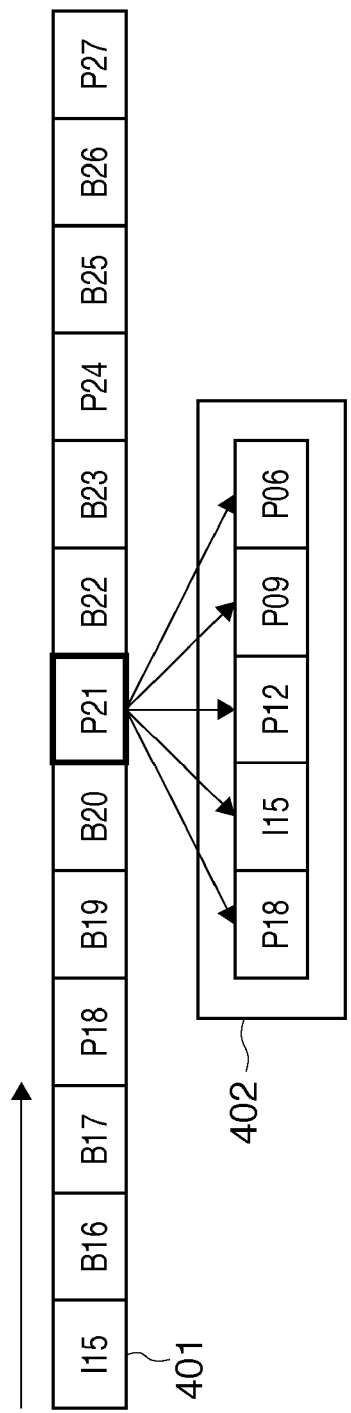
F I G. 4
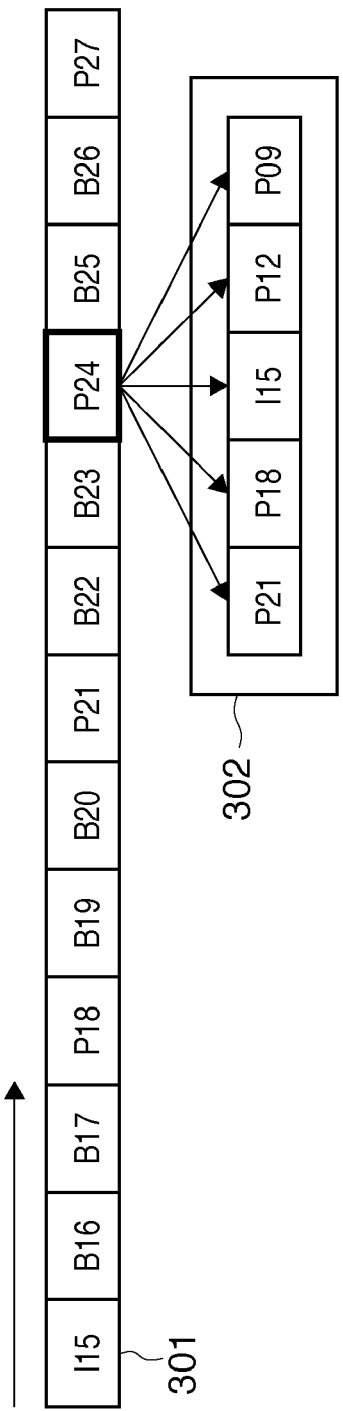
F I G. 5

| PARAMETERS | SETTINGS |
|---|---|
| APERTURE VALUE | F22 |
| ISO | 400 |
| SHUTTER SPEED | 1 / 30 |
| PHOTOMETRY MODE | AVERAGE PHOTOMETRY |
| ELECTRONIC FLASH | INHIBITED |
| EXPOSURE COMPENSATION | INHIBITED |
| AF MODE | MANUAL |

FIG. 16

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>   RADIUS (2 BYTES)<br>   X-COORDINATE OF CENTER (2 BYTES)<br>   Y-COORDINATE OF CENTER (2 BYTES) |
| | | PARAMETERS OF DUST REGION $D_2$ |
| | | . . . |
| | | PARAMETERS OF DUST REGION $D_n$ |

F I G. 21
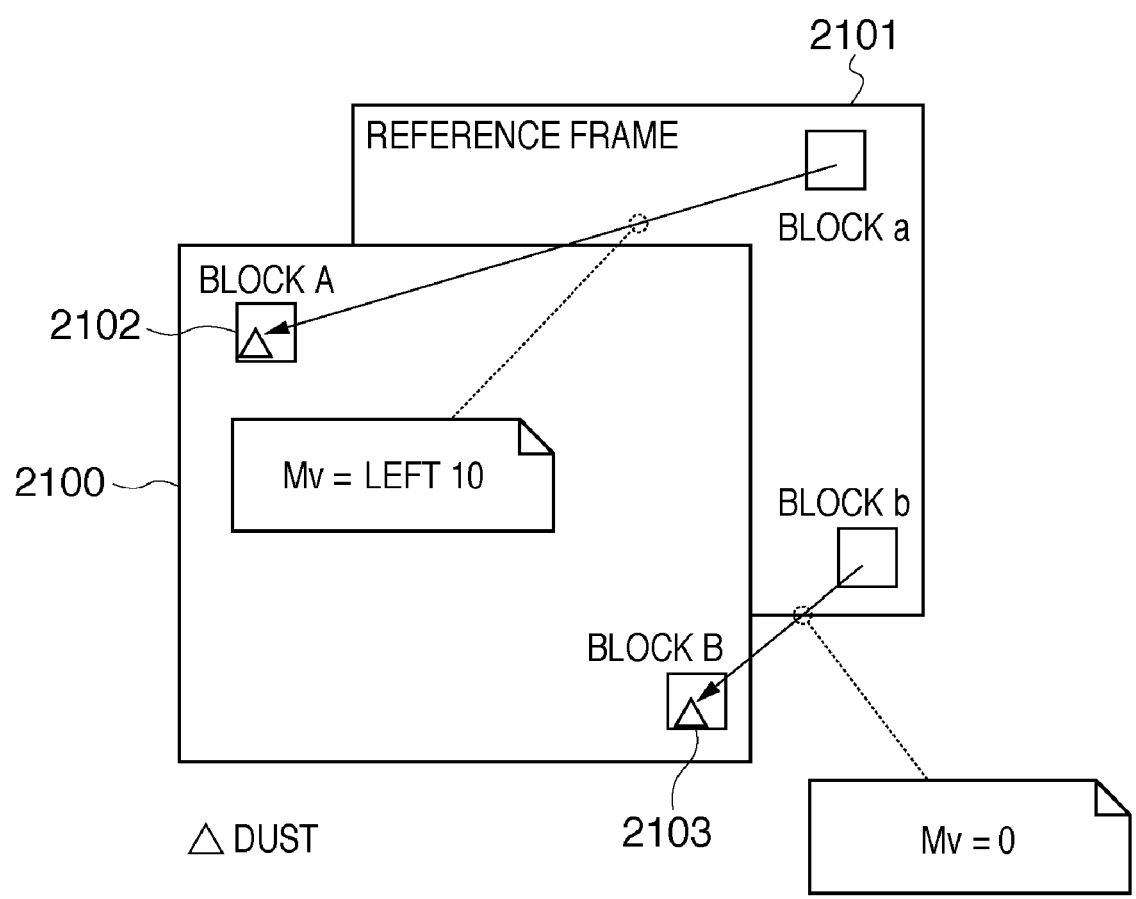

IMAGE PROCESSING APPARATUS, IMAGE PROCESSING METHOD, AND PROGRAM

BACKGROUND OF THE INVENTION

1. Field of the Invention

The present invention relates to a technique of suppressing deterioration of image quality caused by a foreign substance adhering to the surface of an optical low-pass filter or the like arranged in front of an image sensor in an image capturing apparatus using the image sensor such as a CCD sensor or CMOS sensor and, more particularly, to a technique of suppressing deterioration of image quality caused by a foreign substance in moving image shooting.

2. Description of the Related Art

Recently, demand has arisen for a technique of handling moving image information as digital data and encoding it at high compression rate with high quality for use in accumulation and transmission. For image information compression, methods such as MPEG have been proposed and become popular. MPEG compression-encodes image information by orthogonal transform (e.g., discrete cosine transform), motion prediction, and motion compensation using redundancy unique to moving image information.

Manufacturers have developed and commercialized image capturing apparatuses (e.g., a digital camera and digital video camera), DVD recorders, and the like capable of recording images using these encoding methods. Users can easily view images using these apparatuses, personal computers, DVD players, and the like.

These days, H.264 (MPEG4-Part10 AVC) is available as an encoding method aiming at higher compression rates and higher image qualities. It is known that H.264 requires larger calculation amounts for encoding and decoding than those in conventional encoding methods such as MPEG2 and MPEG4, but can achieve higher encoding efficiencies (see ISO/IEC 14496-10, "Advanced Video Coding").

FIG. 1 is a block diagram showing the arrangement of an image processing apparatus which compresses image data by H.264.

Referring to FIG. 1, input image data is divided into macroblocks, which are sent to a subtracter 101. FIG. 2 is a schematic view showing input image data divided into macroblocks. FIG. 3 shows general macroblock partitions. According to H.264, the block size can be selected from 16×16 pixels, 16×8 pixels, 8×16 pixels, and 8×8 pixels. For 8×8 pixels, one of 8×8 pixels, 8×4 pixels, 4×8 pixels, and 4×4 pixels can be selected.

The subtracter 101 calculates the difference between image data and a predicted value, and outputs it to an integer DCT (Discrete Cosine Transform) transform unit 102. The integer DCT transform unit 102 executes integer DCT transform for the input data, and outputs the transformed data to a quantization unit 103. The quantization unit 103 quantizes the input data. The quantized data is sent as difference image data to an entropy encoder 115, while it is inversely quantized by an inverse quantization unit 104 and undergoes inverse integer DCT transform by an inverse integer DCT transform unit 105. An adder 106 adds a predicted value to the inversely DCT-transformed data, reconstructing an image.

The reconstructed image is sent to a frame memory 107 for intra (intra-frame) prediction, while it undergoes deblocking filter processing by a deblocking filter 109 and then is sent to a frame memory 110 for inter (inter-frame) prediction. The image in the intra prediction frame memory 107 is used for intra prediction by an intra prediction unit 108. The intra prediction uses the value of a pixel adjacent to an encoded block as a predicted value.

The image in the inter prediction frame memory 110 is formed from a plurality of pictures, as will be described later. A plurality of pictures are classified into two lists "List0" and "List1". A plurality of pictures classified into the two lists are used for inter prediction by an inter prediction unit 111. After the inter prediction, a memory controller 113 updates internal images. In the inter prediction by the inter prediction unit 111, a predicted image is determined using an optimal motion vector based on the result of motion detection between image data of different frames by a motion detection unit 112.

As a result of intra prediction and inter prediction, a selector 114 selects an optimal prediction result. The motion vector is sent to the entropy encoder 115, and encoded together with the difference image data, forming an output bit stream.

H.264 inter prediction will be explained in detail with reference to FIGS. 4 to 7.

The H.264 inter prediction can use a plurality of pictures for prediction. For this purpose, two lists ("List0" and "List1") are prepared to specify a reference picture. A maximum of five reference pictures can be assigned to each list.

P-pictures use only "List0" to mainly perform forward prediction. B-pictures use "List0" and "List1" to perform bidirectional prediction (or only forward or backward prediction). That is, "List0" holds pictures mainly for forward prediction, and "List1" holds pictures mainly for backward prediction.

FIG. 4 shows an example of a reference list used in encoding. This example assumes that the ratio of I-, P-, and B-pictures is a standard one, that is, I-pictures are arranged at an interval of 15 frames, P-pictures are arranged at an interval of three frames, and B-pictures between I- and P-pictures are arranged at an interval of two frames. In FIG. 4, image data 401 is obtained by arranging pictures in the display order. Each square in the image data 401 describes the type of picture and a number representing the display order. For example, a picture I15 is an I-picture whose display order is 15, and is used for only intra prediction. A picture P18 is a P-picture whose display order is 18, and is used for only forward prediction. A picture B16 is a B-picture whose display order is 16, and is used for bidirectional prediction.

The encoding order is different from the display order, and data are encoded in the prediction order. In FIG. 4, data are encoded in the order of "I15, P18, B16, B17, P21, B19, B20, . . . ."

In FIG. 4, a reference list (List0) 402 holds temporarily encoded/decoded pictures. For example, inter prediction using a picture P21 (P-picture whose display order is 21) refers to pictures which have been encoded and decoded in the reference list (List0) 402. In the example shown in FIG. 4, the reference list 402 holds pictures P06, P09, P12, I15, and P18.

In inter prediction, a motion vector having an optimal predicted value is obtained for each macroblock from reference pictures in the reference list (List0) 402, and encoded. Pictures in the reference list (List0) 402 are discriminated by sequentially giving them reference picture numbers (different from numbers shown in FIG. 4).

After the end of encoding the picture P21, the picture P21 is newly decoded and added to the reference list (List0) 402. The oldest reference picture (in this case, the picture P06) is deleted from the reference list (List0) 402. Encoding proceeds in the order of pictures B19, B20, and P24. FIG. 5 shows the state of the reference list (List0) 402 at this time.

FIG. 6 shows a change of the reference list for each picture.

In FIG. 6, pictures are encoded sequentially from the top. FIG. 6 shows a picture during encoding and the contents of the reference lists (List0 and List1) for it. When a P-picture (or I-picture) is encoded as shown in FIG. 6, the reference lists (List0 and List1) are updated to delete the oldest pictures from the reference lists (List0 and List1). In this example, the reference list (List1) holds only one picture. This is because a larger number of pictures referred to for backward prediction require a larger buffer amount till decoding. In other words, backward pictures excessively distant from a picture during encoding are not referred to.

In this example, I- and P-pictures are referred to, and all I- and P-pictures are sequentially added to the reference lists (List0 and List1). Only P-pictures are used in the reference list (List1) for backward prediction because this picture arrangement is considered to be the most popular one. However, the picture arrangement in the reference list is merely an example of the most popular one, and H.264 itself has a high degree of freedom for the configuration of the reference list.

For example, not all I- and P-pictures need be added to the reference list, and B-pictures can also be added to the reference list. H.264 defines even a long-term reference list of pictures which stay in the reference list until an explicit instruction is received. FIG. 7 shows a change of the reference list when adding B-pictures to the reference list. When adding B-pictures to the reference list, encoded pictures may be added to the reference list every time all B-pictures are encoded.

A file format for recording moving image data compressed in this way will be explained.

As described above, the MP4 (MPEG4) film format is used as a general-purpose format for recording MPEG (MPEG2 or MPEG4 format) image data obtained by a digital video camera, digital still camera, or the like. The MP4 file format ensures compatibility with other digital devices to, for example, play back image data recorded as an MP4 file.

As represented by a of FIG. 8, an MP4 file is basically formed from an mdat box which holds encoded stream image data, and a moov box which holds stream image data-related information. The mdat box is formed from a plurality of chunks (chunk cN), as represented by b of FIG. 8. Each chunk is formed from a plurality of samples (sample sM), as represented by d of FIG. 8. For example, the respective samples sample s1, sample s2, sample s3, sample s4, . . . correspond to encoded MPEG image data $I_0, B_{-2}, B_{-1}, P_3, \ldots$, as represented by e of FIG. 8.

$I_0, I_1, I_2, \ldots, I_n$ represent intra-encoded (intra-frame-encoded) frame image data. $B_0, B_1, B_2, \ldots, B_n$ represent frame image data encoded (inter-frame-encoded) by referring to reference image data bidirectionally. $P_0, P_1, P_2, \ldots, P_n$ represent frame image data encoded (inter-frame-encoded) by referring to reference image data unidirectionally (forward direction). These frame image data are variable-length encoded data.

As represented by c of FIG. 8, the moov box is formed from an mvhd box which holds header information recording the creation date and time, and the like, and a trak box which holds information on stream image data stored in the mdat box. Information stored in the trak box includes an stco box which stores information of an offset value for each chunk of the mdat box, as represented by h of FIG. 8, an stsc box which stores information of the number of samples in each chunk, as represented by g of FIG. 8, and an stsz box which stores information of the size of each sample, as represented by f of FIG. 8.

The amounts of data stored in the stco box, stsc box, and stsz box increase together with the recorded image data amount, that is, the recording time. For example, when an image of 30 frames per sec is recorded as an MP4 file by storing every 15 frames in one chunk, the data amount increases to 1 Mbyte for 2 h, requiring a moov box having a capacity of 1 Mbyte.

When playing back this MP4 file, the moov box of the MP4 file is read out from the recording medium, the stco, stsc, and stsz boxes are analyzed from the moov box. After that, each chunk in the mdat box can be accessed.

When recording an image in the MP4 file format, the stream data increases over time. Since the size of stream data is very large, the stream data needs to be written in the file even during recording. However, the size of the moov box also increases in accordance with the recording time, as described above. The size of the MP4 header is not defined till the end of recording, so the write offset position of stream data in the file cannot be determined. For this reason, recording by a general moving image processing apparatus adopts the following measures using the flexibility of the MP4 file format.

(1) The mdat box is arranged at the start of a file, and after recoding ends, the moov box is arranged next to the mdat box (a of FIG. 9).

(2) As proposed in Japanese Patent Laid-Open No. 2003-289495, the size of the moov box is determined in advance to determine the offset position of the mdat box, and then recoding is done (b of FIG. 9). Even when the recording time is short and the header area does not become full, the area remains as a free box. When recording data over the header size, the data is recorded by properly decimating frame number information of I-pictures, maintaining the header size at a predetermined size.

(3) A pair of moov and mdat boxes is divided into a plurality of pairs to arrange them (c of FIG. 9). The second and subsequent header areas are called moof boxes.

These are the structures of general MP4 files.

A general playback method for the MP4 file will be described below.

FIG. 10 is a block diagram showing an example of the basic arrangement of a moving image playback apparatus which plays back a moving image compression-encoded by H.264.

In FIG. 10, the moving image playback apparatus includes a recording medium 1001, a playback circuit 1002 which plays back data from a recording medium, a buffer circuit 1003, a variable-length decoding circuit 1004, an inverse quantization circuit 1005, an inverse DCT circuit 1006, an addition circuit 1007, a memory 1008, a motion compensation circuit 1009, a switching circuit 1010, a rearrangement circuit 1011, an output terminal 1012, a header information analysis circuit 1013, a playback control circuit 1014, and a control signal input terminal 1015.

The sequence of playback processing in the moving image playback apparatus in FIG. 10 will be explained.

Upon receiving an instruction from the playback control circuit 1014, the playback circuit 1002 plays back an MP4 file recorded on the recording medium 1001, and starts supplying it to the buffer circuit 1003. At the same time, the playback control circuit 1014 controls the header information analysis circuit 1013 to analyze an offset, chunk information, and sample information in the stco box, stsc box, and stsz box representing storage statuses in mdat in the moov box. The playback control circuit 1014 controls the playback circuit 1002 to start playing back stream image data in the mdat box from the recording medium 1001.

The playback circuit 1002 plays back, from the start address, the stream image data in the mdat box of the file recorded on the recording medium 1001, and supplies it to the buffer circuit 1003. Read of the stream image data stored in the buffer circuit 1003 starts in accordance with the occupancy of the buffer circuit 1003 and the like. The stream image data is supplied to the variable-length decoding circuit 1004. The variable-length decoding circuit 1004 executes variable-length decoding of the played-back stream image data supplied from the buffer circuit 1003, and supplies the decoded stream image data to the inverse quantization circuit 1005.

The inverse quantization circuit 1005 inversely quantizes the stream image data which is supplied from the variable-length decoding circuit 1004 upon variable-length decoding. The inverse quantization circuit 1005 supplies the inversely quantized stream image data to the inverse DCT circuit 1006. The inverse DCT circuit 1006 executes inverse DCT for the inversely quantized data supplied from the inverse quantization circuit 1005, and supplies the inverse DCT data to the addition circuit 1007. The addition circuit 1007 adds the inverse DCT data supplied from the inverse DCT circuit 1006, and data supplied from the switching circuit 1010.

Of stream image data played back from the recording medium 1001, intra-frame-encoded data $I_0$ of GOP0 (Group Of Picture) is played back first, as shown in FIG. 11. The playback control circuit 1014 controls to select the terminal a of the switching circuit 1010, and the switching circuit 1010 supplies data "0" to the addition circuit 1007. The addition circuit 1007 adds data "0" supplied from the switching circuit 1010, and inverse DCT data supplied from the inverse DCT circuit 1006, and supplies the added data as a played-back frame $F_0$ to the memory 1008 and rearrangement circuit 1011. The memory 1008 stores the added data supplied from the addition circuit 1007.

Bidirectionally predictive-encoded picture data $B_{-2}$ and $B_{-1}$ are played back next to the intra-frame-encoded data $I_0$ of GOP0. The playback sequence up to the inverse DCT circuit 1006 is the same as that described for the intra-frame-encoded data $I_0$, and a description thereof will not be repeated.

The inverse DCT circuit 1006 supplies bidirectionally predictive-encoded inverse DCT image data to the addition circuit 1007. At this time, the playback control circuit 1014 controls the switching circuit 1010 so that the movable terminal c of the switching circuit 1010 selects the fixed terminal b. Data from the motion compensation circuit 1009 is supplied to the addition circuit 1007.

The motion compensation circuit 1009 detects a motion vector which has been generated in encoding from played-back stream image data and recorded in the stream image data. The motion compensation circuit 1009 reads out data of a reference block (in this case, only data from the played-back intra-frame-encoded data $F_0$ because recording has just started) from the memory 1008, and supplies it to the movable terminal c of the switching circuit 1010.

The addition circuit 1007 adds inverse DCT data supplied from the inverse DCT circuit 1006 and motion-compensated data supplied from the switching circuit 1010. The addition circuit 1007 supplies the added data as played-back frames $F_{-2}$ and $F_{-1}$ to the rearrangement circuit 1011.

Then, unidirectionally predictive-encoded picture data $P_3$ is played back. The playback sequence up to the inverse DCT circuit 1006 is the same as that described for the intra-frame-encoded data $I_0$, and a description thereof will not be repeated.

The inverse DCT circuit 1006 supplies unidirectionally predictive-encoded inverse DCT picture data to the addition circuit 1007. At this time, the playback control circuit 1014 controls the switching circuit 1010 so that the movable terminal c of the switching circuit 1010 selects the fixed terminal b. Data from the motion compensation circuit 1009 is supplied to the addition circuit 1007.

The motion compensation circuit 1009 detects a motion vector which has been generated in encoding from played-back stream image data and recorded in the stream image data. The motion compensation circuit 1009 reads out data of a reference block (data from the played-back intra-frame-encoded data $F_0$) from the memory 1008, and supplies it to the movable terminal c of the switching circuit 1010.

The addition circuit 1007 adds inverse DCT data supplied from the inverse DCT circuit 1006, and motion-compensated data supplied from the switching circuit 1010. The addition circuit 1007 supplies the added data as a played-back frame $F_3$ to the memory 1008 and rearrangement circuit 1011. The memory 1008 stores the added data supplied from the addition circuit 1007.

Then, pictures $B_1$ and $B_2$ are played back. These pictures are not frames at the start of recoding, and thus are played back by the same sequence as that described for the above-mentioned pictures $B_{-2}$ and $B_{-1}$ except that they are played back from the frames $F_0$ and $F_3$ by bidirectional prediction. In the above-described way, $P_6$, $B_4$, $B_5$, . . . are played back sequentially.

The rearrangement circuit 1011 rearranges the sequentially played-back frames $F_0, F_{-2}, F_{-1}, F_3, F_1, F_2, F_6, F_4, F_5, \ldots$ into $F_{-2}, F_{-1}, F_0, F_1, F_2, F_3, F_4, F_5, F_6, \ldots$, and outputs the rearranged frames to the output terminal 1012.

At the start of playing back the file, the header information analysis circuit 1013 analyzes an offset, chunk information, and sample information from the stco box, stsc box, and stsz box representing storage statuses in mdat in the moov box of the MP4 file. Thus, the playback control circuit 1014 operates to skip data till GOP1 and start playing back data from GOP1.

In a lens-interchangeable digital camera, when the lens is detached from the camera body, mote floating in air may enter the camera body. The camera incorporates various mechanical units such as a shutter mechanism which mechanically operate. When these mechanical units operate, dust such as metal powder may be generated in the camera body.

When a foreign substance such as dust or mote adheres to the surface of an optical low-pass filter or the like arranged in front of an image sensor which forms the image capturing unit of a digital camera, the shadow of the foreign substance is contained in a captured image, deteriorating the quality of the sensed image.

To solve this problem, the shadow of a foreign substance is corrected. As a technique applicable to the correction, for example, Japanese Patent Laid-Open No. 2003-289495 proposes an image defect correction method of correcting the pixel defect of an image sensor.

Japanese Patent Laid-Open No. 6-105241 proposes a method for simplifying setting of position information of a pixel defect. More specifically, the extension of an image file recorded in the dust acquisition mode is changed from that of a normal image, and the PC automatically discriminates a dust information image. By using this information, a target image is corrected. Some products record the dust information as photographing information in a recorded image file, and correct a target image using the information.

Japanese Patent Laid-Open No. 2004-242158 discloses a related technique.

However, the capacity of memory used to perform dust correction increases when playing back a moving image file like the above-described MP4 file while correcting a target image based on the dust information. In addition, the moving image playback quality deteriorates owing to low operating speed.

In still image playback, dust correction suffices to be executed once per image to play back a dust-corrected still image. Even if the dust correction processing time is long under the limitation of the memory or the like or the dust correction processing itself takes a long time, playback of a still image can wait till the completion of the dust correction processing.

However, in moving image playback, the motion of an image is expressed by continuously playing back a plurality of still images such as 15 or 30 frames per sec. In addition to general playback processing, processing to correct dust of one frame needs to be executed 15 times for 15 frames per sec or 30 times for 30 frames per sec. Further, the processing to correct dust of one frame is executed by the dust count.

More specifically, for 15 frames, the dust correction processing count per sec is dust correction processing count=15 frames×dust count For 30 frames, dust correction processing count=30 frames×dust count No natural moving image can be played back unless the series of processes ends within the 1-sec limited time.

SUMMARY OF THE INVENTION

The present invention plays back a moving image file such as an MP4 file while performing dust correction processing using dust information, and allow a user to play back a high-quality moving image in which the shadow of dust or the like is corrected.

According to the first aspect of the present invention, there is provided an image processing apparatus comprising: a foreign substance information acquisition unit which acquires, from input moving image data, foreign substance information containing a position and size of a foreign substance adhering to an optical element arranged in front of an image sensor in an image capturing apparatus that captures the moving image data; a motion vector information acquisition unit which acquires, from the moving image data, a motion vector of a macroblock obtained by dividing the moving image data; a correction playback unit which corrects deterioration of image quality caused by the foreign substance, based on the foreign substance information acquired by the foreign substance information acquisition unit, and plays back moving image data; and a determination unit which determines, based on a motion vector of a macroblock matching the position of the foreign substance in the moving image data to be played back by the correction playback unit, whether to perform foreign substance correction playback of the macroblock.

According to the second aspect of the present invention, there is also provided an image processing method comprising: a foreign substance acquisition step of acquiring, from input moving image data, foreign substance information containing a position and size of a foreign substance adhering to an optical element arranged in front of an image sensor in an image capturing apparatus that captures the moving image data; a motion vector information acquisition step of acquiring, from the moving image data, a motion vector of a macroblock obtained by dividing the moving image data; a correction playback step of correcting deterioration of image quality caused by the foreign substance, based on the foreign substance information acquired in the foreign substance acquisition step, and playing back moving image data; and a determination step of determining, based on a motion vector of a macroblock matching the position of the foreign substance in the moving image data to be played back in the correction playback step, whether to perform foreign substance correction playback of the macroblock.

Further features of the present invention will become apparent from the following description of exemplary embodiments with reference to the attached drawings.

BRIEF DESCRIPTION OF THE DRAWINGS

FIG. 2 is a schematic view showing image data divided into macroblocks;

FIG. 3 is a view showing general macroblock partitions;

FIG. 4 is a view exemplifying a reference list when encoding a picture P21 according to the prior art;

FIG. 5 is a view exemplifying a reference list when encoding a picture P24 according to the prior art;

FIG. 16 is a view exemplifying the data format of dust correction data in the first embodiment;

FIG. 21 is a view schematically showing the relationship between the motion vector and the reference frame;

DESCRIPTION OF THE EMBODIMENTS

Embodiments of the present invention will now be described in detail with reference to the accompanying drawings.

First Embodiment

The arrangement of an image capturing apparatus according to the first embodiment of the present invention will be explained with reference to FIG. 12. The first embodiment will exemplify a single-lens reflex digital still camera as the image capturing apparatus. The present invention is also applicable to, for example, a lens-interchangeable digital video camera as the image capturing apparatus.

Figure 1:
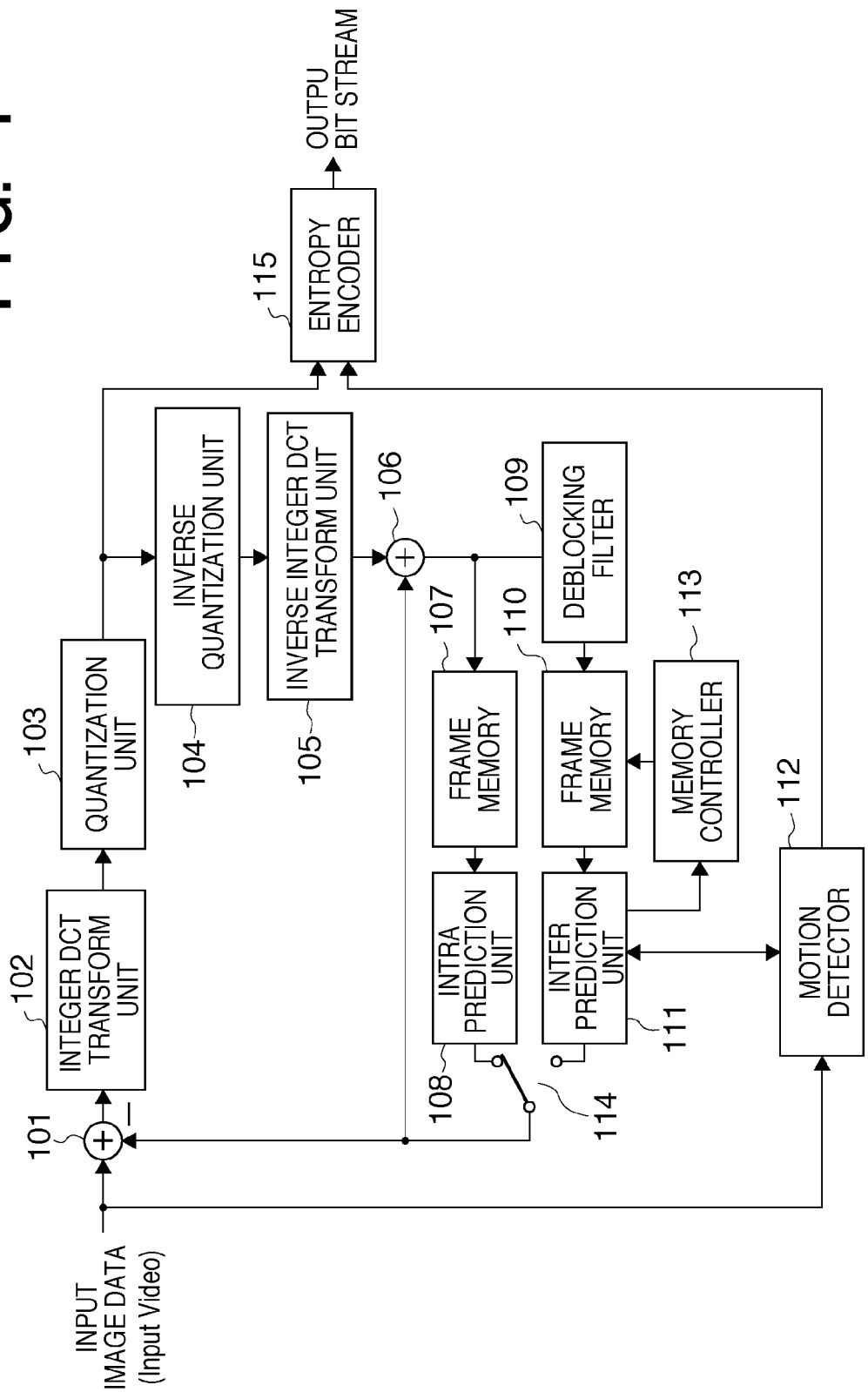
FIG. 1 is a block diagram showing the arrangement of an image processing apparatus according to a prior art.
Figure 6:
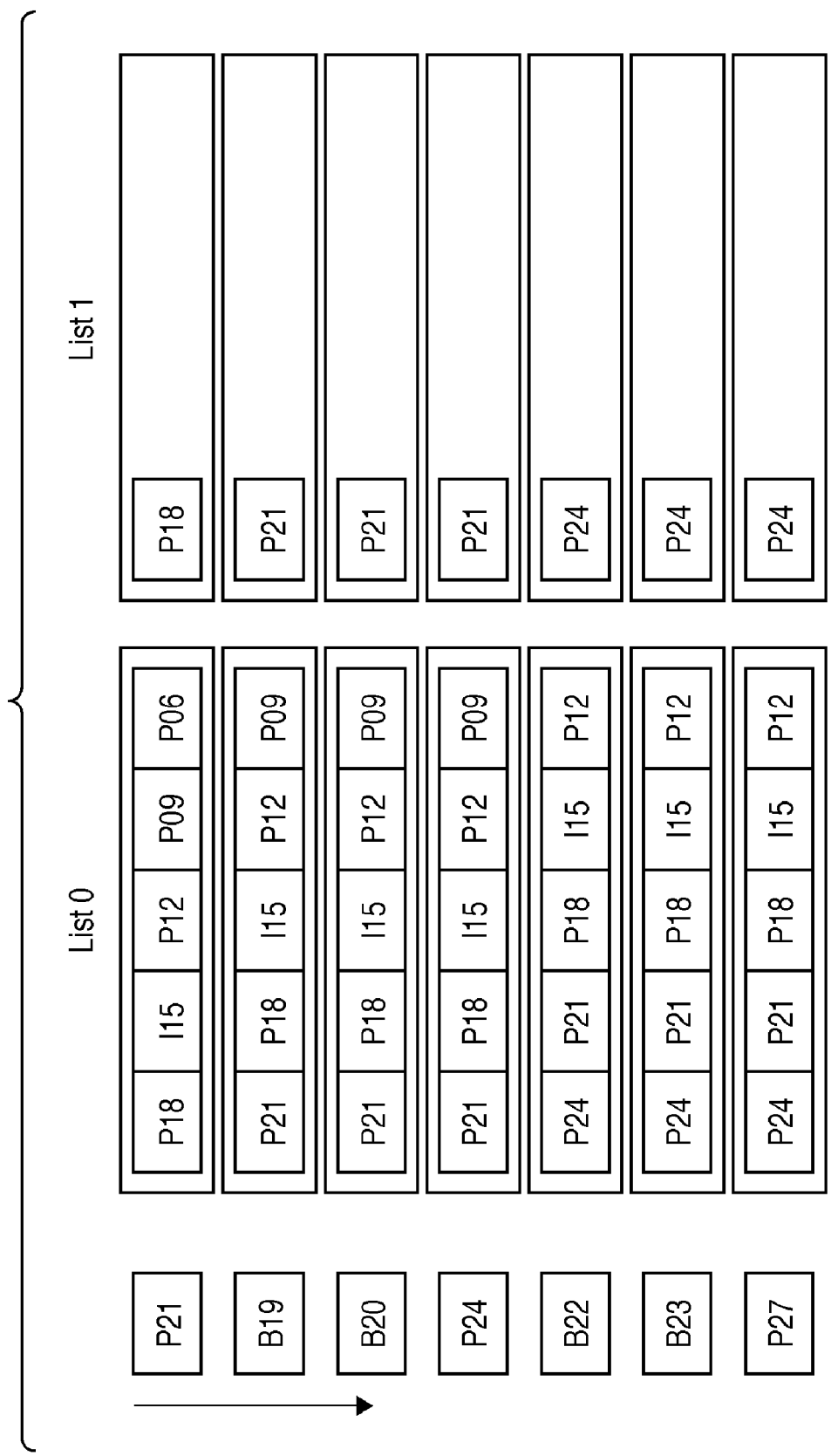
FIG. 6 is a view showing a change of the reference list for each picture according to the prior art.
Figure 7:
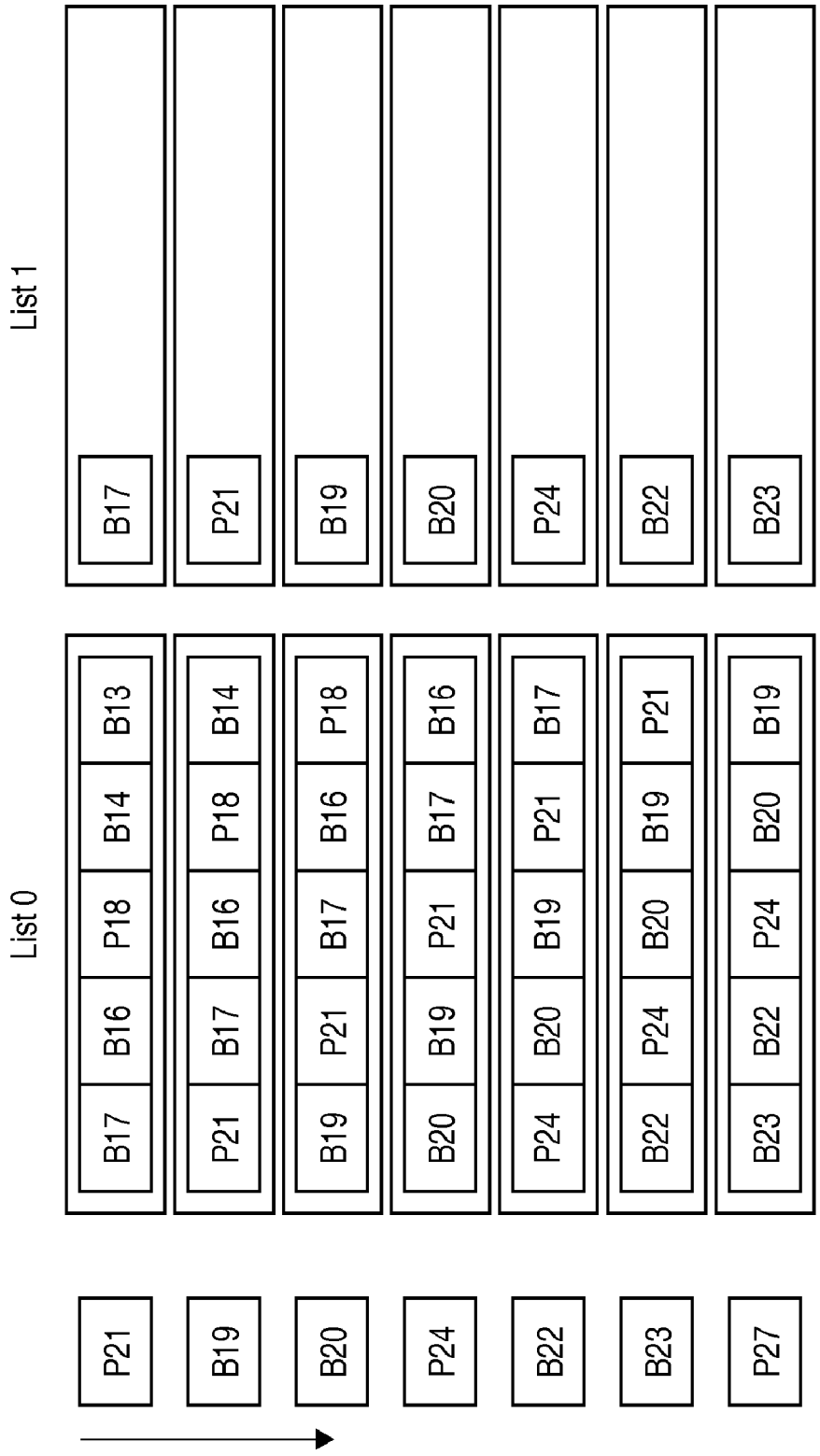
FIG. 7 is a view showing a change of the reference list when adding B-pictures to the reference list according to the prior art.
Figure 8:
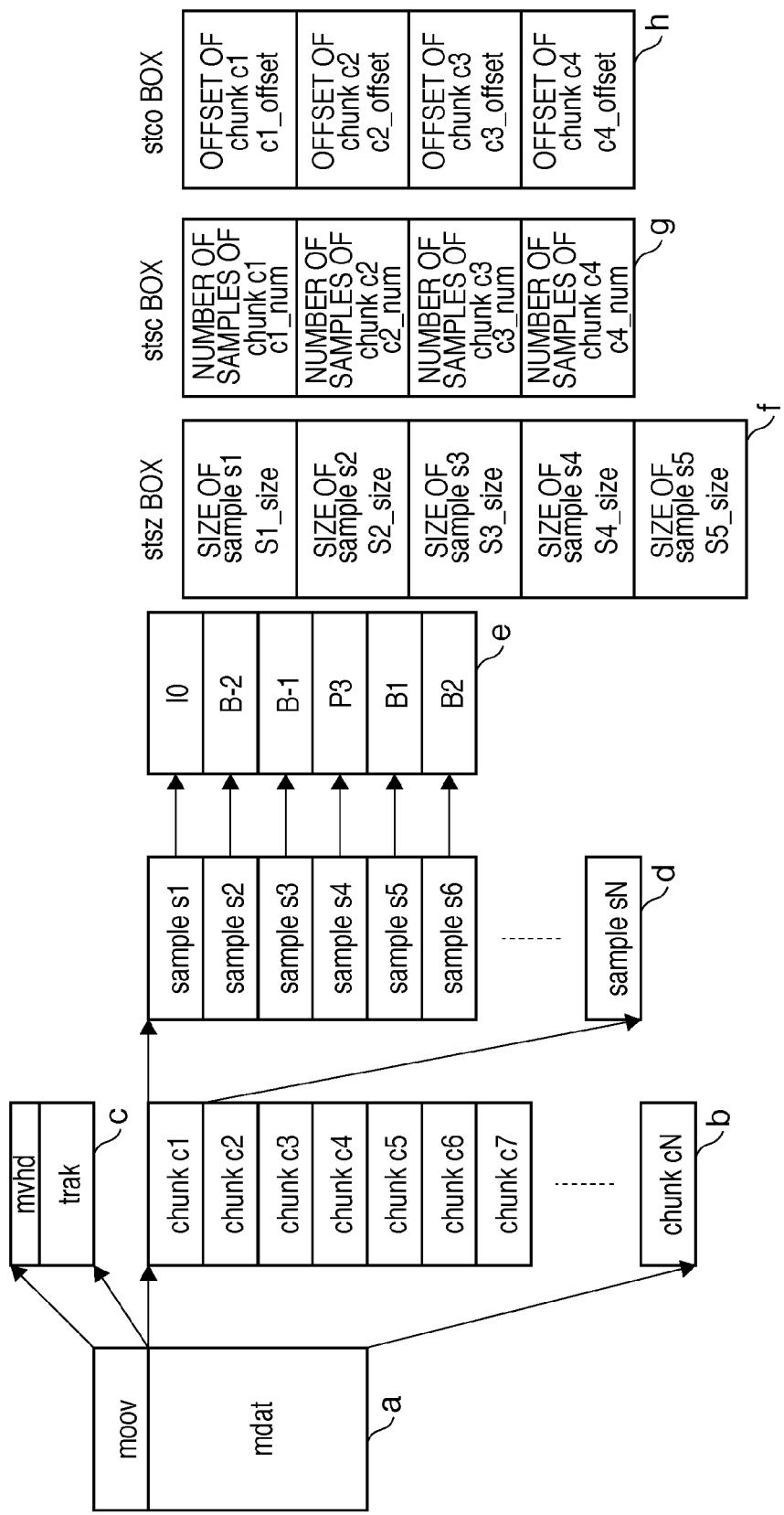
FIG. 8 is a view for explaining the structure of an MP4 file.
Figure 9:
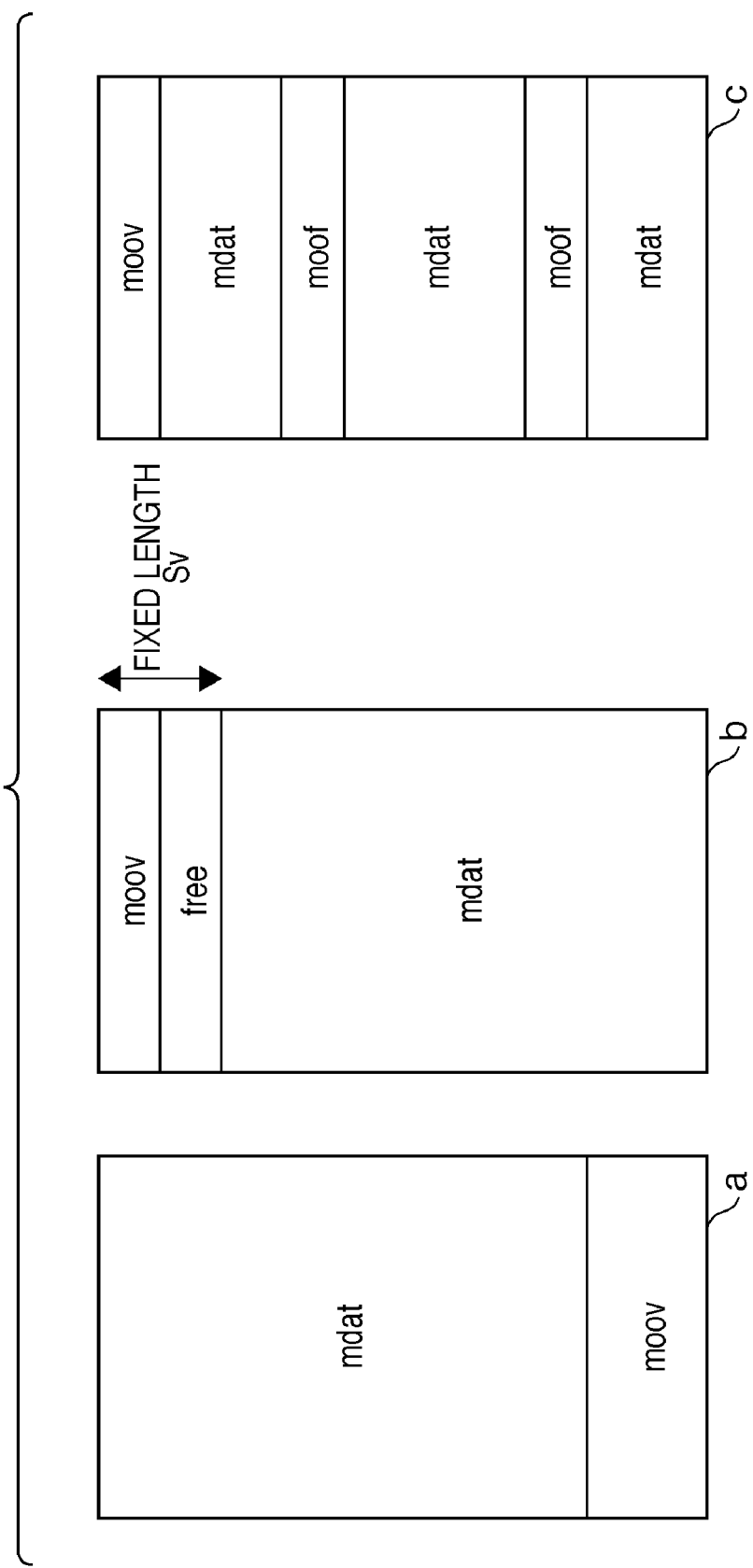
FIG. 9 is a view exemplifying the structure of an MP4 file.
Figure 10:
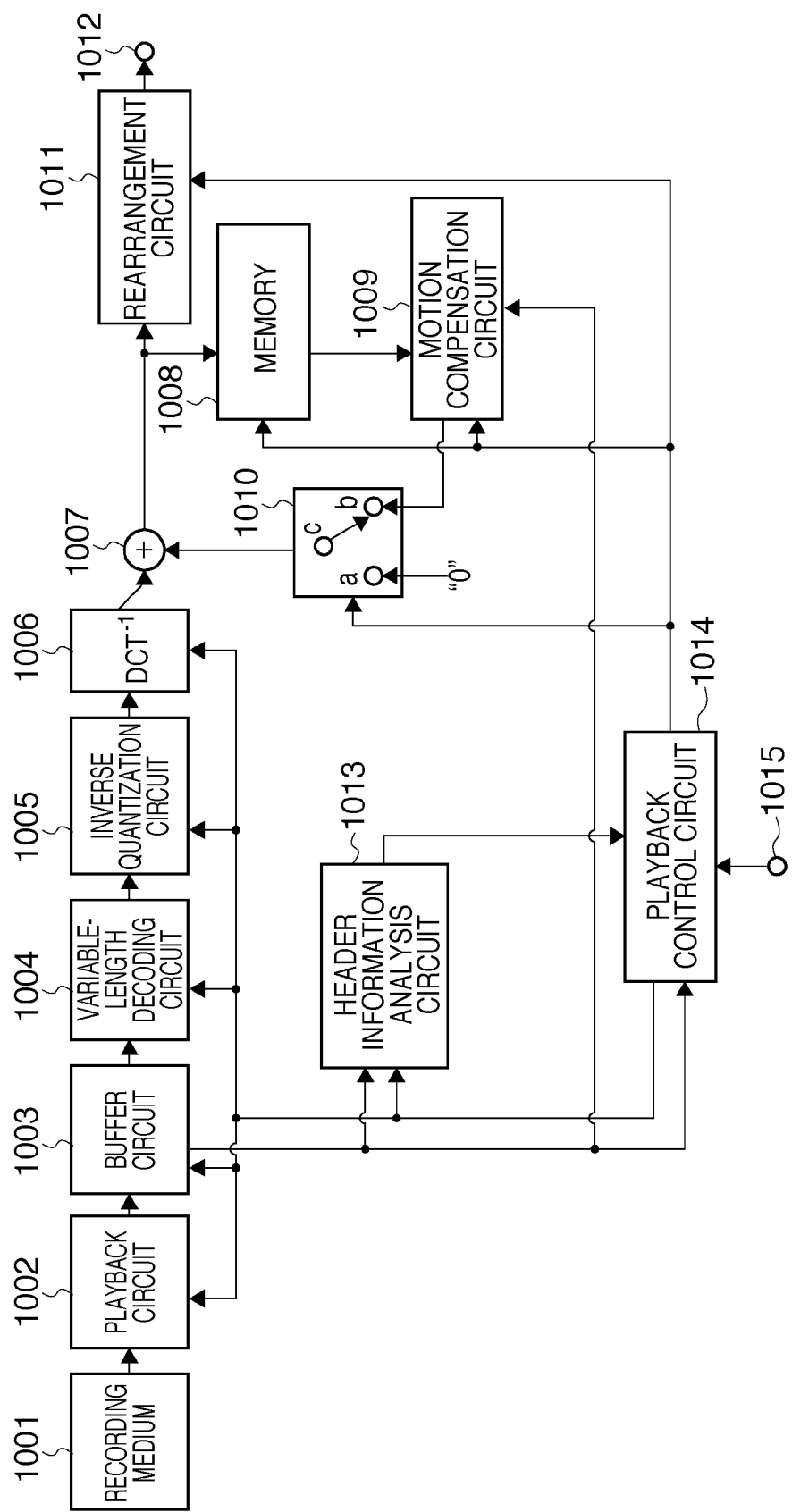
FIG. 10 is a block diagram for explaining a playback apparatus according to the prior art.
Figure 11:
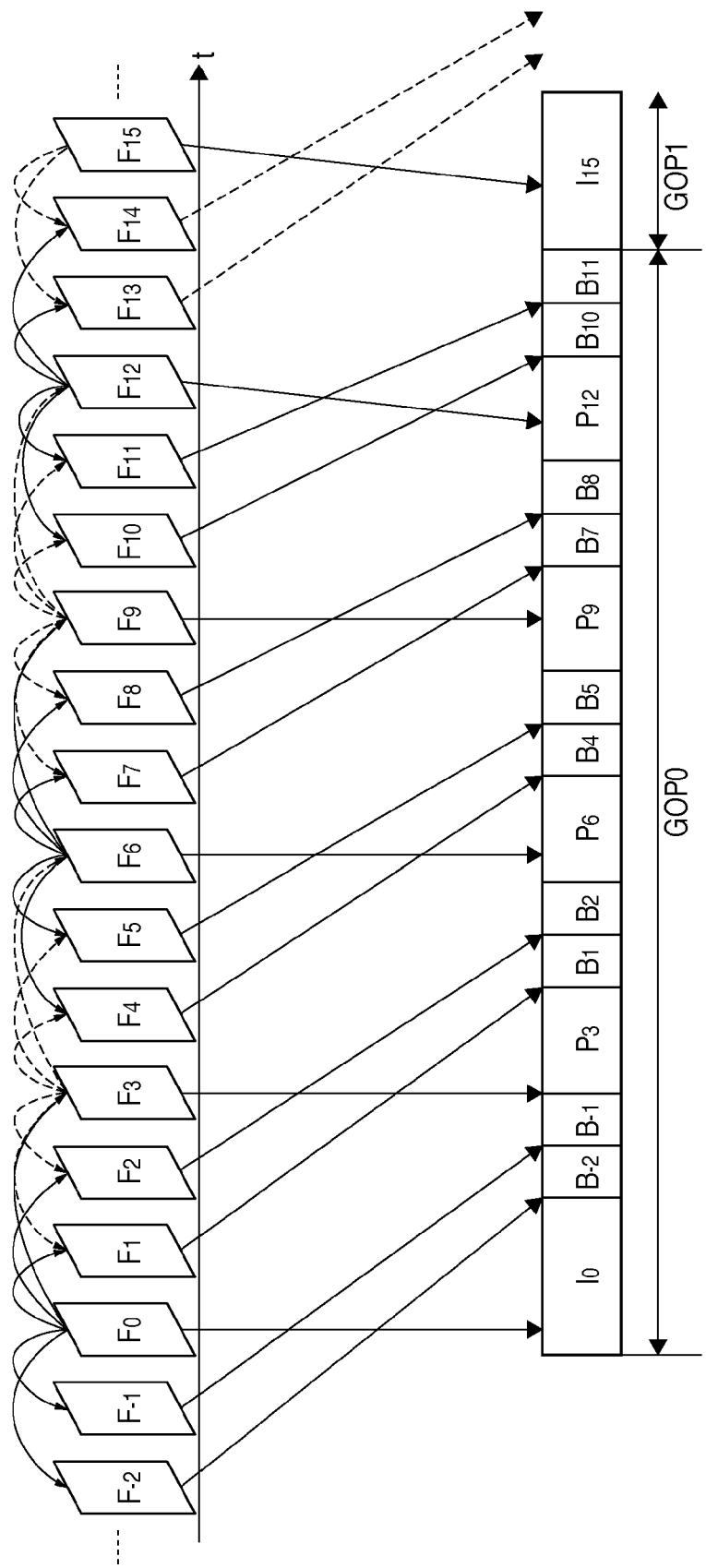
FIG. 11 is a view for explaining the order of frames to be encoded according to the prior art.
Figure 12:
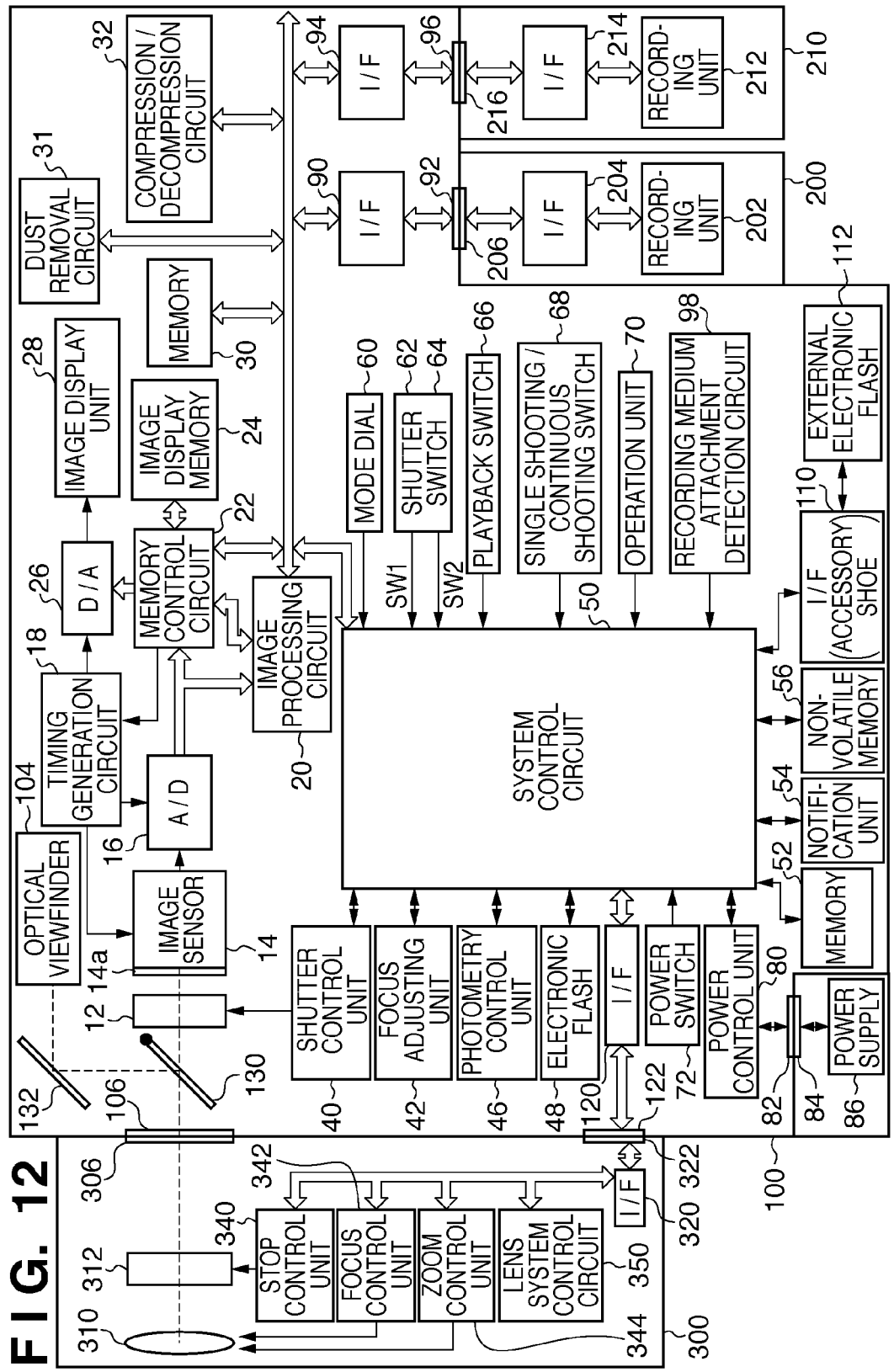
FIG. 12 is a block diagram showing the arrangement of an image capturing apparatus according to the first embodiment of the present invention.

As shown in FIG. 12, the image capturing apparatus according to the embodiment mainly includes a camera body 100 and an interchangeable-lens type lens unit 300.

The lens unit 300 includes an imaging lens 310 formed from a plurality of lenses, a stop 312, and a lens mount 306 which mechanically connects the lens unit 300 to the camera body 100. The lens mount 306 incorporates various functions for electrically connecting the lens unit 300 to the camera body 100. In the lens mount 306, an interface 320 connects the lens unit 300 to the camera body 100. A connector 322 electrically connects the lens unit 300 to the camera body 100.

The connector 322 also has a function of exchanging control signals, status signals, and data signals between the camera body 100 and the lens unit 300 and receiving currents of various voltages. The connector 322 may communicate not only by telecommunication but also by optical communication or speech communication.

A stop control unit 340 controls the stop 312 in cooperation with a shutter control unit 40 (to be described later) which controls a shutter 12 of the camera body 100 based on photometry information from a photometry control unit 46. A focus control unit 342 controls focusing of the imaging lens 310. A zoom control unit 344 controls zooming of the imaging lens 310.

A lens system control circuit 350 controls the overall lens unit 300. The lens system control circuit 350 has a memory for storing constants, variables, and programs for operations. The lens system control circuit 350 also has a nonvolatile memory for holding identification information such as a number unique to the lens unit 300, management information, functional information such as maximum and minimum aperture values and a focal length, and current and past set values.

The arrangement of the camera body 100 will be described next.

A lens mount 106 mechanically connects the camera body 100 to the lens unit 300. Mirrors 130 and 132 guide a light beam which has entered the imaging lens 310 to an optical viewfinder 104 by the single-lens reflex method. The mirror 130 can be either a quick return mirror or a half mirror. Reference numeral 12 denotes a focal plane shutter. An image sensor 14 photoelectrically converts an object image. The light beam which has entered the imaging lens 310 is guided via the stop 312 serving as a light quantity restriction means, the lens mounts 306 and 106, the mirror 130, and the shutter 12 by the single-lens reflex method, and forms an optical image on the image sensor 14. Note that an optical element 14a such as an optical low-pass filter is arranged in front of the image sensor 14. An image generated by the image sensor 14 contains the shadow of a foreign substance such as dust adhering to the surface of the optical element 14a, deteriorating the image quality. The embodiment is directed to a technique of suppressing the deterioration of image quality.

An A/D converter 16 converts an analog signal output from the image sensor 14 into a digital signal. A timing generation circuit 18 supplies clock signals and control signals to the image sensor 14, the A/D converter 16, and a D/A converter 26. The timing generation circuit 18 is controlled by a memory control circuit 22 and system control circuit 50.

An image processing circuit 20 executes predetermined pixel interpolation processing and color conversion processing for data from the A/D converter 16 or data from the memory control circuit 22. If necessary, the image processing circuit 20 performs predetermined arithmetic processing using image data output from the A/D converter 16. Based on the obtained arithmetic result, the system control circuit 50 can execute auto-focus (AF) processing, auto-exposure (AE) processing, and pre-electronic flash (EF) processing of TTL (Through The Lens) scheme to control the shutter control unit 40 and a focus adjusting unit 42. The image processing unit 20 also executes predetermined arithmetic processing using image data output from the A/D converter 16 and performs automatic white balance (AWB) processing of TTL scheme based on the obtained arithmetic result.

In the embodiment, the focus adjusting unit 42 and photometry control unit 46 are provided for exclusive use. AF processing, AE processing, and EF processing may be done using not the image processing circuit 20 but the focus adjusting unit 42 and photometry control unit 46. Alternatively, AF processing, AE processing, and EF processing may be performed first using the focus adjusting unit 42 and photometry control unit 46 and then using the image processing circuit 20.

The memory control circuit 22 controls the A/D converter 16, the timing generation circuit 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or via only the memory control circuit 22.

Display image data written in the image display memory 24 is displayed on an image display unit 28 such as a TFT type LCD via the D/A converter 26. The image display unit 28 sequentially displays captured image data, thereby implementing an electronic viewfinder (EVF) function. The image display unit 28 can arbitrarily turn on/off its display in accordance with an instruction from the system control circuit 50. When display is OFF, the power consumption of the camera body 100 can greatly be reduced.

The memory 30 is used to store captured still images or moving images and has a memory capacity enough to store a predetermined number of still images or a predetermined amount of moving image. Even in continuous shooting or panoramic shooting to continuously capture a plurality of still images, many images can be written in the memory 30 at high speed. When a moving image is captured, the memory 30 is used as a frame buffer to successively write images at a predetermined rate. The memory 30 is also usable as the work area of the system control circuit 50.

A dust removal circuit 31 removes the shadow of dust contained in image data by image processing using dust information stored in a nonvolatile memory 56 (to be described later) and optical information obtained from the lens unit 300.

The compression/decompression circuit 32 compresses/decompresses image data using a known compression method. The compression/decompression circuit 32 reads out an image from the memory 30, compresses or decompresses it, and writes the processed data in the memory 30 again.

The shutter control unit 40 controls the shutter 12 in cooperation with the stop control unit 340 that controls the stop 312 based on photometry information from the photometry control unit 46. The focus adjusting unit 42 executes AF (Auto Focus) processing. A light beam which has entered the imaging lens 310 of the lens unit 300 is guided via the stop 312, the lens mounts 306 and 106, the mirror 130, and a focus adjusting sub-mirror (not shown) by the single-lens reflex method, measuring the focus state of an image formed as an optical image.

The photometry control unit 46 executes AE (Auto Exposure) processing. A light beam which has entered the imaging lens 310 of the lens unit 300 is guided via the stop 312, the lens mounts 306 and 106, the mirror 130, and a photometry sub-mirror (not shown) by the single-lens reflex method, measuring the exposure state of an image formed as an optical image. An electronic flash 48 has an AF auxiliary light projecting function and an electronic flash control function. The photometry control unit 46 also has an EF (Electronic Flash control) processing function in cooperation with the electronic flash 48.

AF control may also be done based on the measurement result of the focus adjusting unit 42 and an arithmetic result obtained by arithmetically processing image data from the A/D converter 16 by the image processing circuit 20. Exposure control may also be performed based on the measurement result of the photometry control unit 46 and an arithmetic result obtained by arithmetically processing image data from the A/D converter 16 by the image processing circuit 20.

The system control circuit 50 controls the overall camera body 100 and incorporates a known CPU. A memory 52 stores constants, variables, and programs for the operation of the system control circuit 50.

A notification unit 54 notifies the outside of operation states, messages, and the like using a text, image, and sound in accordance with program execution by the system control circuit 50. Examples of the notification unit 54 are a display unit such as an LCD or LED for visual display and a sound generation element for generating a notification by sound. The notification unit 54 includes a combination of two or more of them. Especially, the display unit is arranged at one or a plurality of visible positions near an operation unit 70 of the camera body 100. The optical viewfinder 104 incorporates some functions of the notification unit 54.

The display contents of the image display unit 28 such as an LCD among those of the notification unit 54 include display associated with shooting modes (e.g., single shooting/continuous shooting and self timer), display associated with recording (e.g., compression rate, the number of recording pixels, the number of recorded images, and the number of recordable images), and display associated with shooting conditions (e.g., shutter speed, aperture value, exposure compensation, brightness compensation, external flash light emission amount, and red eye mitigation). The image display unit 28 also displays macro shooting, buzzer setting, battery level, error message, numerical information by a plurality of digits, and the attached/detached states of a recording medium 200 and PC 210. The image display unit 28 also displays the attached/detached state of the lens unit 300, communication I/F operation, date and time, and the connection state of an external computer.

Some display contents of the notification unit 54 are indicated in the optical viewfinder 104, which include, for example, in-focus, ready for shooting, camera shake warning, flash charge, flash charge completion, shutter speed, aperture value, exposure compensation, and recording medium write operation.

The nonvolatile memory 56 is an electrically erasable/programmable memory such as an EEPROM and stores programs (to be described later) and the like.

Reference numerals 60, 62, 64, 66, 68, and 70 denote operation means for inputting various kinds of operation instructions of the system control circuit 50. They include a single component or a combination of components such as a switch, dial, touch panel, pointing by line-of-sight detection, and voice recognition device.

The operation means will be described here in detail.

The mode dial switch 60 can selectively set a functional shooting mode such as an automatic shooting mode, programmed shooting mode, shutter speed priority shooting mode, stop priority shooting mode, manual shooting mode, or focal depth priority (depth) shooting mode. The mode dial switch 60 can also selectively set a functional shooting mode such as a portrait shooting mode, landscape shooting mode, closeup shooting mode, sports shooting mode, nightscape shooting mode, and panoramic shooting mode. The mode dial can also switch the shooting mode to a moving image shooting mode which is a feature of the embodiment.

The shutter switch SW1 62 is turned on by operating a shutter button (not shown) halfway (e.g., half stroke) to designate the start of an operation such as AF processing, AE processing, AWB processing, or EF processing.

The shutter switch SW2 64 is turned on by operating the shutter button (not shown) completely (e.g., full stroke) to designate the start of a series of processing operations including exposure, development, and recording. In the exposure processing, a signal read out from the image sensor 14 is written in the memory 30 via the A/D converter 16 and memory control circuit 22. Then, the development processing is done based on calculation by the image processing circuit 20 or memory control circuit 22. In the recording processing, image data is read out from the memory 30, compressed by the compression/decompression circuit 32, and written in or transmitted to the recording medium 200 or PC 210.

The playback switch 66 designates the start of a playback operation to read out an image captured in a shooting mode from the memory 30, recording medium 200, or PC 210 and display it on the image display unit 28. The playback switch 66 can set another functional mode such as a playback mode, multiwindow playback/erase mode, or PC-connected mode.

The single shooting/continuous shooting switch 68 can set a single shooting mode in which when the user presses the shutter switch SW2 64, the camera shoots one frame and then stands by, or a continuous shooting mode in which the camera keeps shooting while the user presses the shutter switch SW2 64.

The operation unit 70 includes various buttons and a touch panel. For example, the operation unit 70 includes a live view start/stop button, moving image recording start/stop button, menu button, set button, multiwindow playback/page feed button, flash setting button, single shooting/continuous shooting/self timer switch button, menu move plus (+) button, and menu move minus (−) button. The operation unit 70 further includes a playback image move plus (+) button, playback image move minus (−) button, shooting image quality select button, exposure compensation button, brightness compensation button, external flash light emission amount setting button, and date/time setting button. The numerical values or functions of the plus and minus buttons can be selected more easily using a rotary dial switch.

Also, the operation unit 70 includes an image display ON/OFF switch for turning on/off the image display unit 28, and a quick review ON/OFF switch for setting a quick review function of automatically playing back image data obtained immediately after shooting. The operation unit 70 includes a compression mode switch for selecting a compression rate for JPEG compression, or a RAW mode to directly digitize a signal from the image sensor and record it on a recording medium. The operation unit 70 includes an AF mode setting switch capable of setting a one-shot AF mode and servo AF mode. In the one-shot AF mode, the auto-focus operation starts when the user presses the shutter switch SW1 62. Once an in-focus state is obtained, this state is kept held. In the servo AF mode, the auto-focus operation continues while the user presses the shutter switch SW1 62. The operation unit 70 further includes a setting switch capable of setting a dust information acquisition mode to capture a dust detection image and acquire dust information, as will be described later.

A power switch 72 can selectively set the power ON or power OFF mode of the camera body 100. The power switch 72 can also selectively set the power ON or power OFF mode of each of various accessories such as the lens unit 300, an external electronic flash 112, the recording medium 200, and the PC 210 connected to the camera body 100.

A power supply control unit 80 includes a cell detection circuit, DC/DC converter, and switching circuit for switching a block to be energized. The power supply control unit 80 detects the attachment/detachment of a cell, the type of cell, and the battery level. The power supply control unit 80 controls the DC/DC converter based on the detection result and an instruction from the system control circuit 50, supplying a necessary voltage to the units including a recording medium for a necessary period.

Reference numerals 82 and 84 denote connectors; and 86, a power supply unit formed from a primary cell (e.g., alkaline cell or lithium cell), a secondary cell (e.g., NiCd cell, NiMH cell, Li-ion cell, or Li-polymer cell), or an AC adapter.

Reference numerals 90 and 94 denote interfaces with a PC or a recording medium (e.g., memory card or hard disk); and 92 and 96, connectors to connect a PC or a recording medium (e.g., memory card or hard disk). A recording medium attachment detection circuit 98 detects whether the recording medium 200 or PC 210 is attached to the connectors 92 and/or 96.

In the embodiment, there are two systems of interfaces and connectors to connect a recording medium. The interfaces and connectors to connect a recording medium can have either one or a plurality of systems. Interfaces and connectors of different standards may also be combined.

Interfaces and connectors compliant with various storage medium standards are usable. Examples are a PCMCIA (Personal Computer Memory Card International Association) card, CF (CompactFlash®) card, and SD card. When the interfaces 90 and 94 and the connectors 92 and 96 comply with the standard of the PCMCIA card or CF® card, they allow connecting various kinds of communication cards. Examples of the communication cards are a LAN card, modem card, USB (Universal Serial Bus) card, and IEEE (Institute of Electrical and Electronic Engineers) 1394 card. A P1284 card, SCSI (Small Computer System Interface) card, and PHS are also available. Image data and management information associated with it can be transferred to another computer or a peripheral device such as a printer by connecting these kinds of communication cards.

The optical viewfinder 104 can display an optical image formed by a light beam which enters the imaging lens 310 and is guided via the stop 312, lens mounts 306 and 106, and mirrors 130 and 132 by the single-lens reflex method. It is therefore possible to perform shooting using not the electronic viewfinder function of the image display unit 28 but only the optical viewfinder. Some functions of the notification unit 54 such as an in-focus state, camera shake warning, flash charge, shutter speed, aperture value, and exposure compensation are displayed in the optical viewfinder 104.

The external electronic flash 112 is attached via an accessory shoe 110.

An interface 120 connects the camera body 100 to the lens unit 300 in the lens mount 106.

The connector 122 electrically connects the camera body 100 to the lens unit 300. A lens attachment detection unit (not shown) detects whether the lens unit 300 is attached to the lens mount 106 and connector 122. The connector 122 also has a function of exchanging control signals, status signals, data signals, and the like between the camera body 100 and the lens unit 300 and supplying currents of various voltages. The connector 122 may communicate not only by telecommunication but also by optical communication or speech communication.

The recording medium 200 is a memory card or hard disk. The recording medium 200 includes a recording unit 202 formed from a semiconductor memory or magnetic disk, an interface 204 with the camera body 100, and a connector 206 to connect the camera body 100.

As the recording medium 200, a memory card (e.g., PCM-CIA card or CompactFlash®), or a hard disk is usable. The recording medium 200 may also be a micro DAT, a magnetooptical disk, an optical disk (e.g., CD-R or CD-RW), or a phase-change optical disk (e.g., a DVD).

The PC 210 includes a recording unit 212 formed from a magnetic disk (HD), an interface 214 with the camera body 100, and a connector 216 to connect the camera body 100. The interface 214 can be a USB, IEEE1394, or the like, but is not particularly limited.

Playback processing to correct the influence of dust on the optical member 14a such as a low-pass filter or cover glass arranged in front of the image sensor of the image capturing apparatus having the above-described arrangement will be described next.

According to the method of the embodiment, a dust detection image is captured to acquire dust information (foreign substance information). Dust data is extracted and added to a subsequently captured normal image. The image is then played back while executing dust correction by a PC or the like. The dust detection image is preferably acquired by capturing a surface having a luminance as uniform as possible. However, uniformity need not be strict because it is desirable to easily capture the image in a familiar place. For example, the embodiment assumes capturing a blue sky or white wall. To explain a feature of the embodiment, an operation for the MP4 file format mainly for a moving image file will be described in detail.

Figure 13:
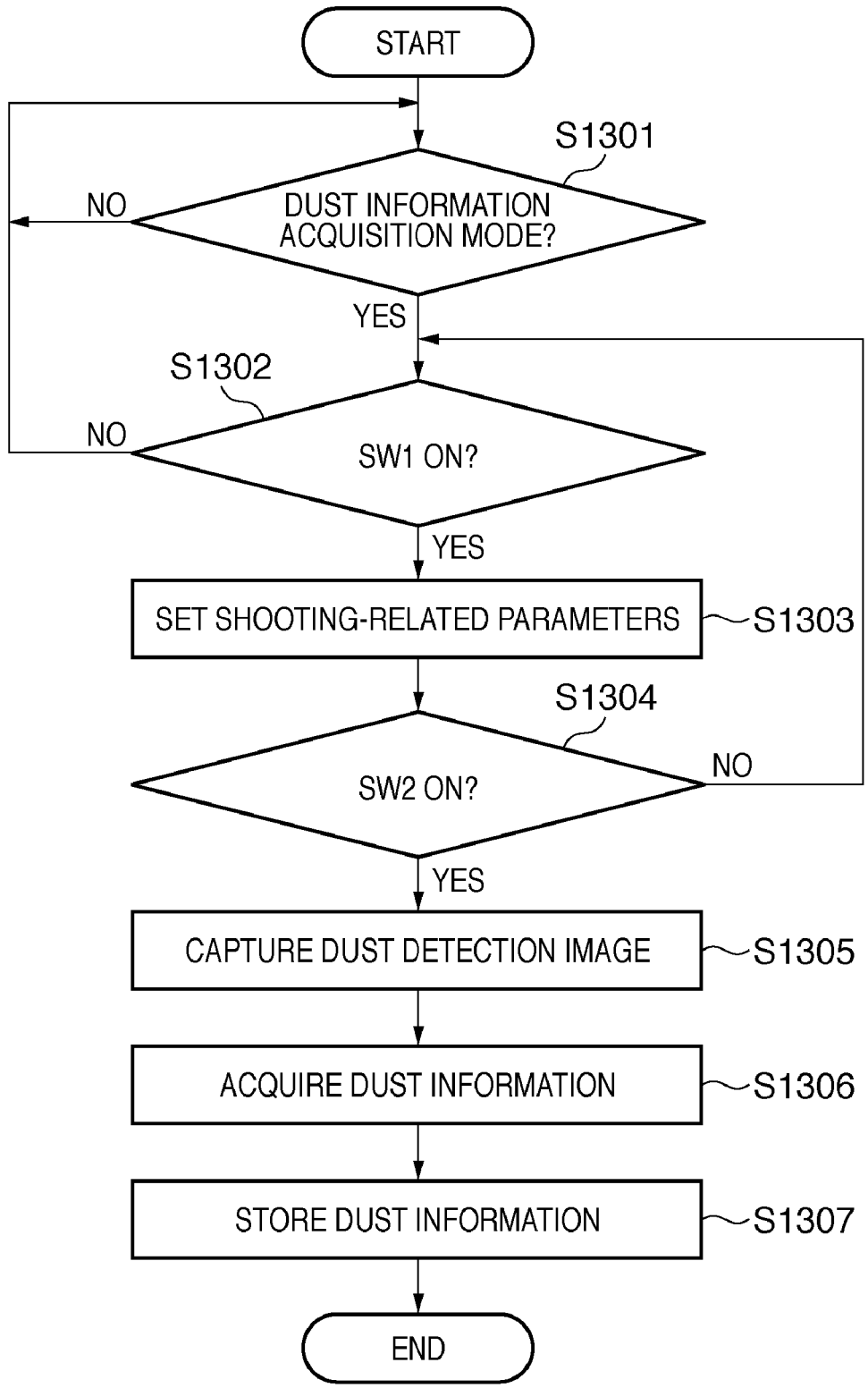
FIG. 13 is a flowchart showing processing in the image capturing apparatus when acquiring dust information in the first embodiment.

FIG. 13 is a flowchart showing processing in the image capturing apparatus when acquiring dust information in the embodiment.

First, in step S1301, it is determined whether the user has selected the dust information acquisition mode with the operation unit 70. The determination in step S1301 is repeated until the dust information acquisition mode is selected. If the user has selected the dust information acquisition mode, the process advances to step S1302 to determine whether the user has turned on the shutter switch SW1 62. If the shutter switch SW1 62 is OFF, the process returns to step S1301 to repeat the processing.

Figures 14, 15:
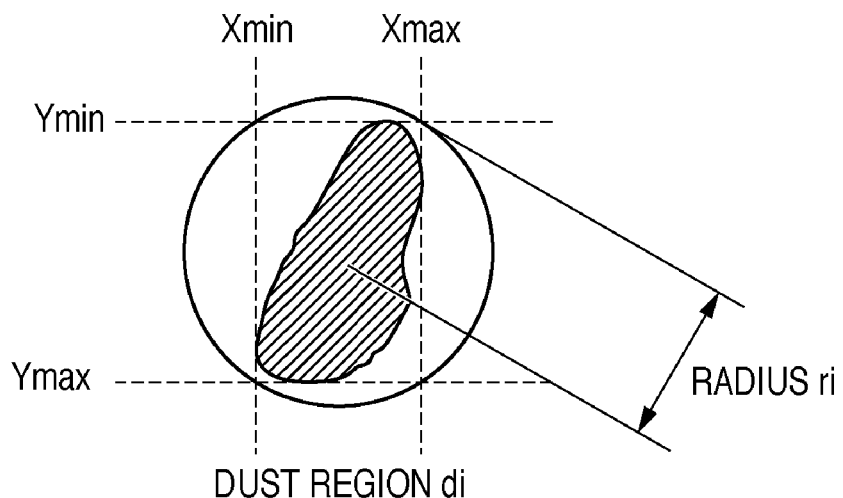
FIG. 14 is a table showing a setting example of shooting-related parameters when acquiring dust information in the first embodiment.
FIG. 15 is a view showing an outline of dust region size calculation in step S1306 of FIG. 13 in the first embodiment.

If the user has turned on the shutter switch SW1 62, the process advances to step S1303 to set the aperture value, ISO value, shutter speed, and other shooting-related parameters. FIG. 14 shows the parameters set here. The aperture value is set to, for example, F22 to stop down the aperture. Shooting may be done using the minimum aperture within a range settable in the lens unit 300 connected to the lens mount 306. The aperture is stopped down because dust normally adheres not to the surface of the image sensor 14 but to the surface of a protective glass protecting the image sensor 14 or an optical filter placed not on the image sensor side but on the object side, and the imaging state changes depending on the aperture value of the lens unit 300. At almost the full-aperture value, the dust image blurs, failing to acquire an appropriate dust detection image. It is therefore preferable to shoot at the minimum aperture.

Referring back to the flowchart in FIG. 13, at this time, the user points the image capturing apparatus to a uniform luminance surface such as a wall as white as possible and operates the shutter switch SW2 64.

In step S1304, it is determined whether the user has turned on the shutter switch SW2 64. If the shutter switch SW2 64 is OFF, the process returns to step S1302 to determine whether the shutter switch SW1 62 is ON or OFF. If the user has turned on the shutter switch SW2 64, the process advances to step S1305.

In step S1305, the dust detection image (uniform luminance surface) is captured to store the image data in the memory 30. In step S1306, dust information is acquired from the image data stored in the memory 30.

The acquisition of dust information will be described. More specifically, the position (coordinates) and size of a dust region are acquired from the captured dust detection image. First, the region of the captured dust detection image is divided into a plurality of blocks. Then, a maximum luminance Lmax and average luminance Lave in each block are calculated. A threshold value T1 in each block is calculated by $$T1 = Lave \times 0.6 + Lmax \times 0.4$$

A pixel less than the threshold value T1 is determined as a dust pixel. Each isolated region formed from dust pixels is defined as a dust region di (i=0, 1, . . . , n).

FIG. 15 is a view showing an outline of dust region size calculation. As shown in FIG. 15, a maximum value Xmax and minimum value Xmin of the horizontal coordinates and a maximum value Ymax and minimum value Ymin of the vertical coordinates of pixels forming a dust region are acquired for each dust region. A radius ri representing the size of the dust region di is calculated by $$ri = [\sqrt{\{(Xmax - Xmin)^2 + (Ymax - Ymin)^2\}}]/2$$

Center coordinates (Xdi,Ydi) are approximated by $$Xdi = (Xmax + Xmin)/2$$

$$Ydi = (Ymax + Ymin)/2$$

The calculated position (coordinates) and radius are recorded as a dust information profile.

The dust information profile takes a structure as shown in FIG. 16. As shown in FIG. 16, the dust information profile stores lens information and information of the position and size of dust upon capturing a dust detection image. More specifically, the actual aperture value (F-number) and the lens pupil position upon capturing a detection image are stored as the lens information upon capturing the detection image. Then, the number (integer value) of detected dust regions is stored in the storage area. Next to this value, the specific parameters of each dust region are stored repeatedly as many as the dust regions. The parameters of the dust region are a set of three numerical values: the radius of dust (e.g., 2 bytes), the x-coordinate of the center of an effective image area (e.g., 2 bytes), and the y-coordinate of the center (e.g., 2 bytes).

In a moving image file like the MP4 file mentioned above, the dust information profile is stored in an mvhd box formed from header information in the moov box or an mvhd box in the moof box.

In the embodiment, data of the position and size of detected dust are described as dust information in an image file, but the dust information is not limited to this. For example, bitmap data representing a dust region in an entire image may be directly recorded. It is also possible that the dust information file of the dust information profile is created separately and only link information to the dust information file is described in the image file. Hence, the data format of the dust information is not particularly limited. Detection of dust suffices to utilize the fact that dust adhering to the optical element 14a in front of the image sensor 14 decreases the quantity of light entering a pixel corresponding to the dust adhesion position. For example, a pixel suffering a decreased incident light quantity can be detected by comparing each pixel data with a preset luminance value. If it cannot be expected to shoot a uniform luminance surface, dust may be determined using not only the threshold of the luminance but also the difference from a neighboring pixel output. Note that the above-described dust detection method is merely an example, and the present invention does not particularly limit the method for detecting dust.

The acquired dust information is stored in the nonvolatile memory 56 in step S1307, and the processing to acquire dust information ends. At this time, dust information is stored in the nonvolatile memory 56 to keep adding dust information to image data obtained by normal shooting executed before dust information is acquired next time after dust information was acquired. When the image capturing apparatus requests the user to acquire dust information in every power-on operation, the dust information need not always be stored in the nonvolatile memory.

The purpose of a shooting operation in the dust information acquisition mode is to acquire dust information. In the embodiment, therefore, a captured image itself is neither compressed nor recorded on the recording medium 200 so as not to waste the capacity of the recording medium 200 by image data unnecessary for the user. However, an image captured in the dust information acquisition mode may also be compressed and saved in the recording medium 200, similar to a normal image. At this time, the data can be arbitrarily modified by, for example, changing the extension.

The sequence of dust correction playback (foreign substance correction playback) processing will be explained. In the following description, the dust correction playback processing is done not in the digital camera body but in a separately prepared image processing apparatus.

Figure 17:
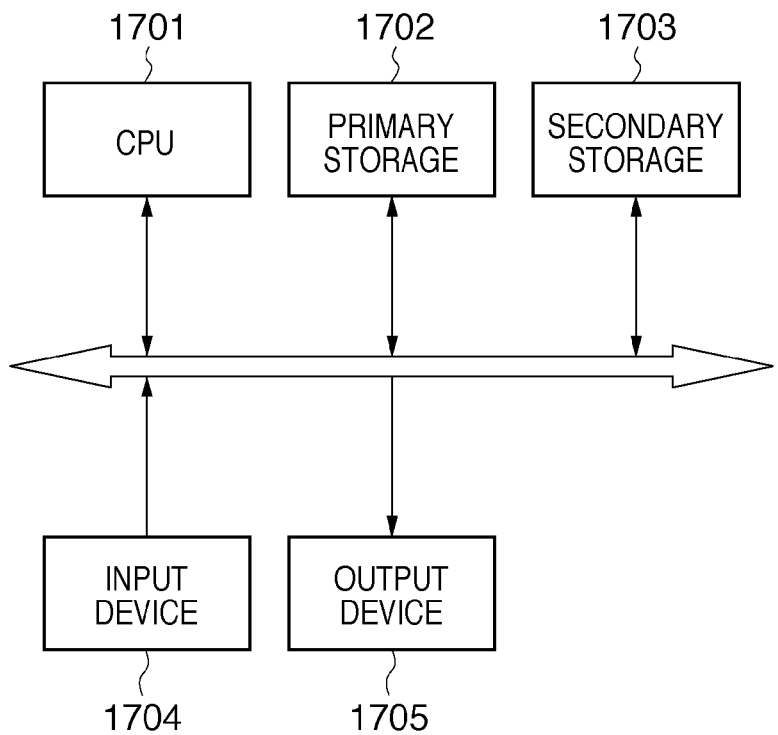
FIG. 17 is a block diagram showing the schematic system configuration of the image processing apparatus in the first embodiment.

FIG. 17 is a block diagram showing the schematic system configuration of the image processing apparatus. A CPU 1701 controls the overall system, and executes a program stored in a primary storage 1702. The primary storage 1702 is mainly a memory. The primary storage 1702 loads a program from a secondary storage 1703, and stores it. The secondary storage 1703 is, for example, a hard disk. In general, the primary storage is smaller in capacity than the secondary storage. The secondary storage stores programs, data, and the like which cannot be completely stored in the primary storage. The secondary storage also stores data which need to be stored for a long time.

In the embodiment, the secondary storage 1703 stores programs. When executing a program, it is loaded to the primary storage 1702 and executed by the CPU 1701. An input device 1704 includes a mouse and keyboard used to control the system, and a card reader, scanner, and film scanner necessary to input image data. An output device 1705 is, for example, a monitor or printer. The apparatus can take other various arrangements, but this is not a gist of the present invention and a description thereof will be omitted.

The image processing apparatus incorporates an operating system capable of parallel-executing a plurality of programs. The user can use a GUI (Graphical User Interface) to operate a program running on the apparatus.

Figure 18:
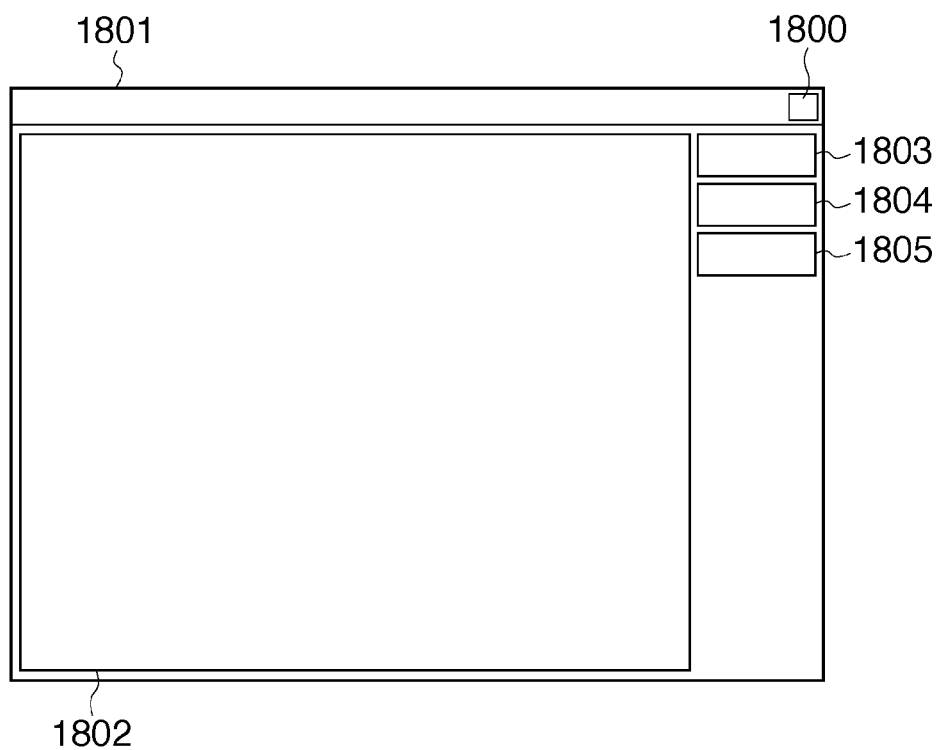
FIG. 18 is a view exemplifying a GUI in the image processing apparatus.

FIG. 18 is a view showing the GUI of an image editing program in the image processing apparatus. The window has a close button 1800 and title bar 1801. The user ends the program by pressing the close button. The user designates an image to undergo correction playback by dragging and dropping it to an image display area 1802. When the user decides an image to undergo correction playback, the title bar 1801 displays the file name. The target image is displayed in the image display area 1802 to be fitted in it. The user presses a correction playback execution button 1803 to execute dust correction playback processing (to be described later). The image display area 1802 displays the processed image.

Figure 19:
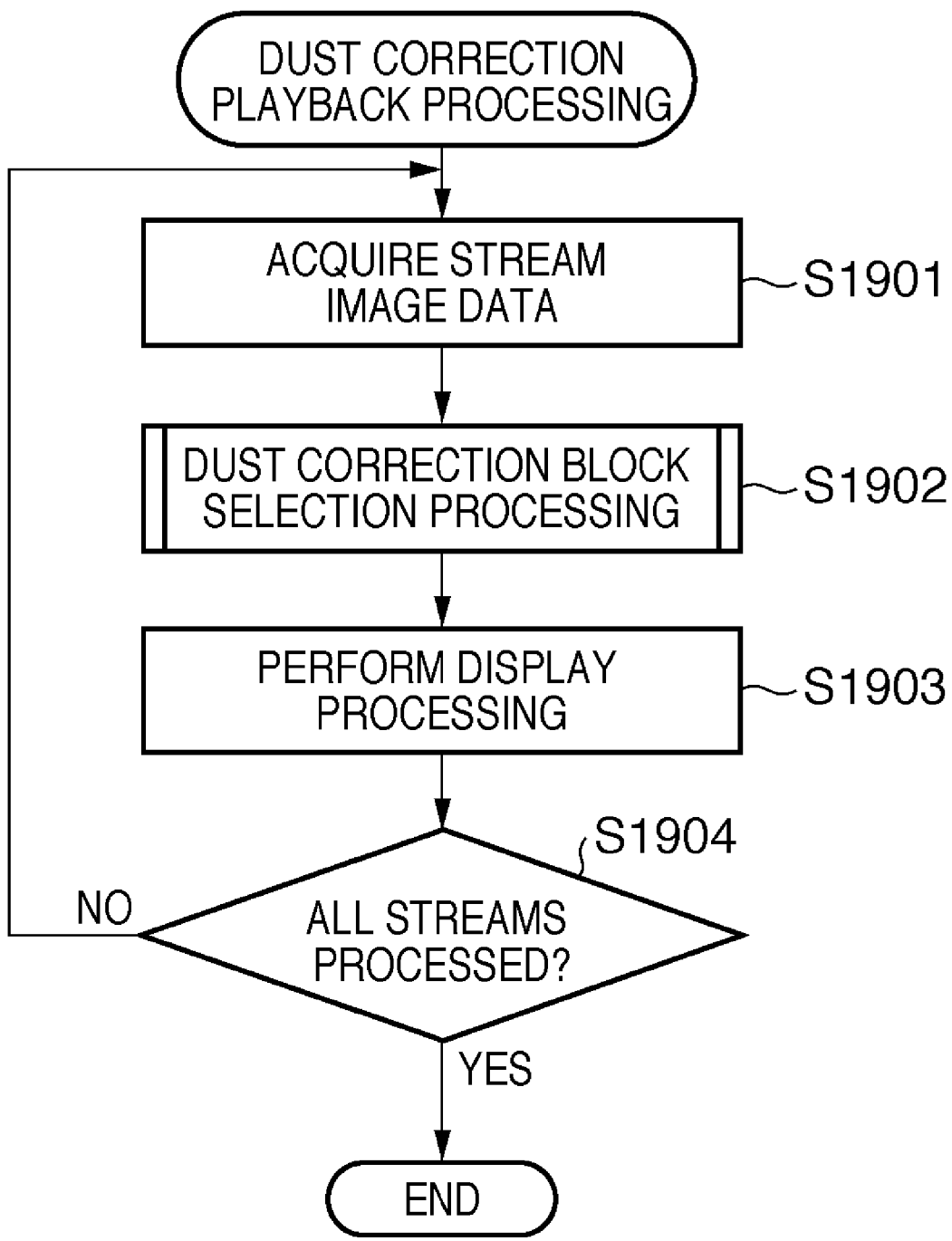
FIG. 19 is a flowchart for explaining dust correction playback processing in the first embodiment.

FIG. 19 shows the sequence of the dust correction playback processing in the image processing apparatus.

In step S1901, the image processing apparatus receives a moving image file containing dust position correction data from the digital camera or the recording medium 200 dismounted from the digital camera. The image processing apparatus stores stream image data to be displayed in the primary storage 1702 or secondary storage 1703. As described above, the stream image data is acquired by reading the moov box of an MP4 file from the recording medium, analyzing the stco, stsc, and stsz boxes from the moov box, and accessing each chunk in the mdat box.

In step S1902, the image processing apparatus executes dust correction block selection processing to select a block to undergo dust correction playback processing from each frame of a moving image to be displayed in the image display area 1802 in the moving image file. The dust correction block selection processing will be described later with reference to FIG. 20.

In step S1903, the image processing apparatus performs display processing. In the display processing, an image is displayed in the image display area 1802. This processing is a known technique described in Description of the Related Art, and a detailed description thereof will not be repeated.

In step S1904, the image processing apparatus determines whether all streams have been processed. If the image processing apparatus determines that all streams have been processed, it ends the dust correction playback processing. If all streams have not been processed, the process returns to the dust correction frame selection processing to repeat the subsequent steps until all streams have been processed.

The dust correction playback processing is executed according to this sequence.

Figure 20:
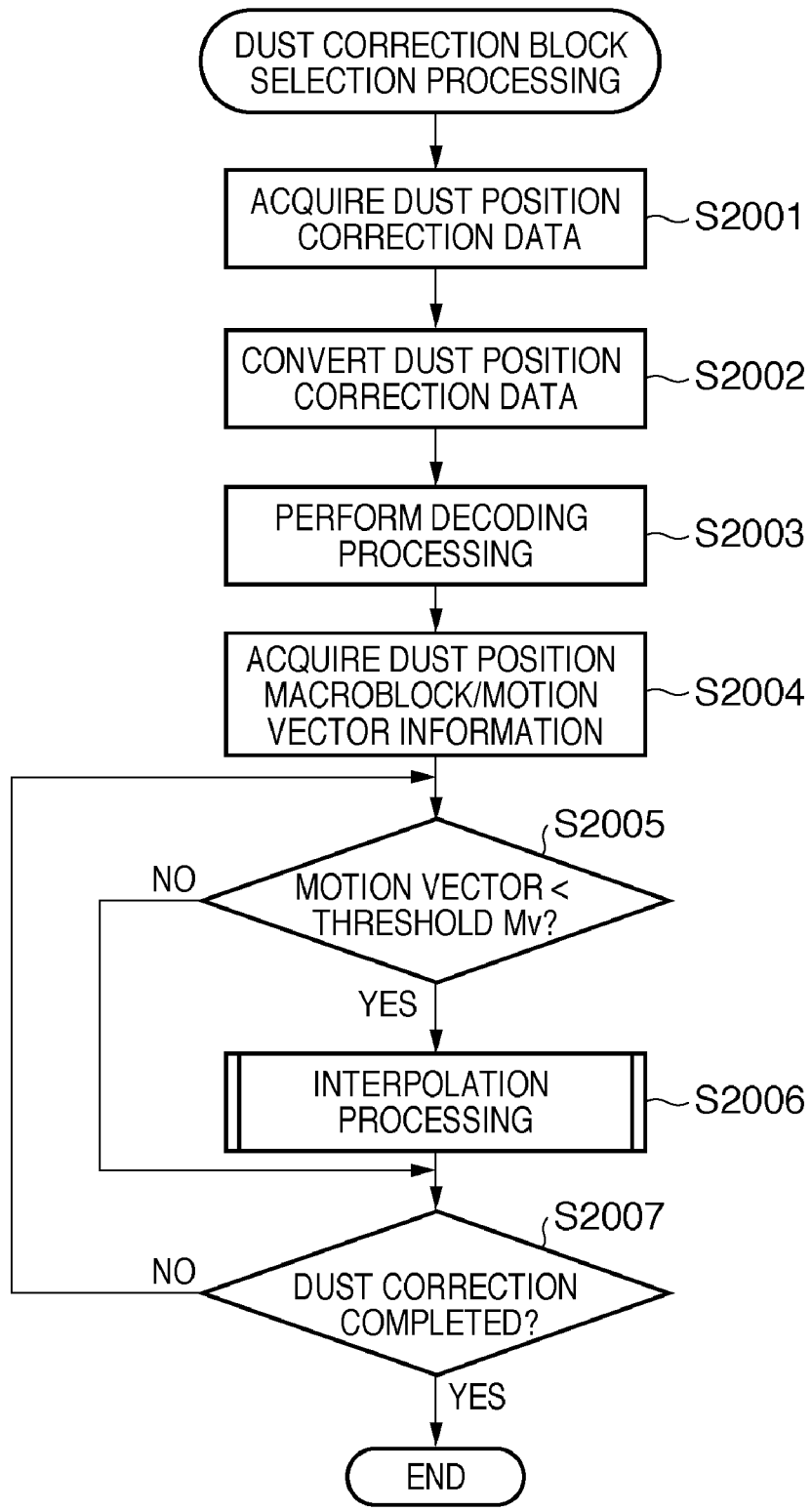
FIG. 20 is a flowchart for explaining details of dust correction block selection processing in the first embodiment.

FIG. 20 shows the sequence of the dust correction block selection processing.

In step S2001, dust position correction data is extracted from moov or moof (acquisition of foreign substance information). As described above, the dust information profile is stored in an mvhd box formed from header information in the moov box or an mvhd box in the moof box. However, the data format of the dust information or the like is not particularly limited, and a method of acquiring other data will not be particularly described in detail. It is important to extract dust position correction data.

First, dust correction data is extracted from the dust position correction data extracted in step S2001, obtaining a coordinate sequence Di (i=1, 2, . . . , n), a radius sequence Ri (i=1, 2, . . . , n), an aperture value f1, and a lens pupil position L1 (step S2002). Then, an aperture value f2 and lens pupil position L2 upon shooting are acquired. In this case, Ri represents the size of dust at coordinates Di calculated in step S1306 of FIG. 13. In step S2002, Di is converted by the following equation. Converted coordinates Di' and a converted radius Ri' are defined by $$Di'(x,y) = (L2 \times (L1-H) \times d/((L2-H) \times L1)) \times Di(x,y)$$

$$Ri' = (Ri \times f1/f2 + 3) \qquad (1)$$

where d is the distance from the image center to the coordinates Di, and H is the distance from the surface of the image sensor 14 to dust.

The unit is a pixel, and "+3" of Ri' means a margin.

From the dust position correction data, the position and size of dust of an image are obtained.

The stream image data acquired in step S1901 is decoded (played back) (step S2003). By the basic arrangement and sequence as described above, stream image data is decoded (played back). In this arrangement, the CPU 1701 and primary storage 1702 mainly execute this processing.

In decoding of step S2003, a motion vector which has been generated in encoding and recorded in stream image data is detected from the played-back stream image data, and data of a reference block is read out from the memory 1008. In dust position macroblock/motion vector information acquisition processing of step S2004, dust-containing (matching) macroblock/motion vector information determined from the position and size of dust obtained in step S2002 is stored in the primary storage 1702 in association with the dust.

In step S2005, a macroblock matching the dust position and the magnitude of the motion vector on the macroblock are determined from the acquired dust information and the macroblock/motion vector information associated with it. If it is determined that the motion vector of the macroblock matching the dust position is smaller than a threshold Mv, dust in a region defined by the coordinates Di' and radius Ri' is detected in step S2006. If necessary, interpolation processing is applied to the dust. Details of the interpolation processing will be described later. If it is determined that the motion vector of the macroblock matching the dust position is equal to or larger than the threshold Mv, the process advances to step S2007 without performing the interpolation processing in step S2006. The threshold Mv may be statically determined, or dynamically selected and changed in accordance with the playback operation environment. Needless to say, the user may set an arbitrary value.

This determination is made for the following reason. A predicted image is decided for stream image data using an optimum motion vector based on the result of motion detection between image data of different frames. The motion vector is entropy-encoded together with difference image data to form an output bit stream. It can be determined that a larger motion vector means a more dynamic motion of the macroblock between frames. That is, the threshold Mv is one criterion for determining the magnitude of motion of a given macroblock between frames.

FIG. 21 schematically shows the relationship between the motion vector and the reference frame. Block A of a frame 2100 refers to block a of a reference frame 2101. The value of a motion vector from block a to block A is Mv=left 10, and there is no prediction error.

In addition, block B of the frame 2100 refers to block b of the reference frame 2101. The value of a motion vector from block b to block B is Mv=0, and there is no prediction error.

That is, an object on block a moves to block A, and an object on block b stays on block B. This reveals that dust 2102 on block A is contained in the motion and dust 2103 on block B is contained in a still portion.

The shadow of dust in a relatively uniform still frame like a blue sky or white wall is conspicuous. In contrast, the shadow of dust in a motion frame hardly stands out. This is because it is difficult for a human eye to recognize small dust in a dynamically changing frame.

According to the embodiment, only the motion vector of a macroblock matching a dust position is selected and determined without determining the motion vectors of all macroblocks.

From this, it is determined whether the magnitude of the motion vector of a macroblock matching a dust position is equal to or larger than the threshold Mv. Based on this determination, a macroblock to undergo dust correction processing and a macroblock not to undergo it can be discriminated.

In step S2007, it is determined whether dust removal processing has been applied to all coordinates. If the processing has ended for all coordinates, the process ends; if NO, returns to step S2005.

The sequence of the dust correction block selection processing has been described.

Figure 22:
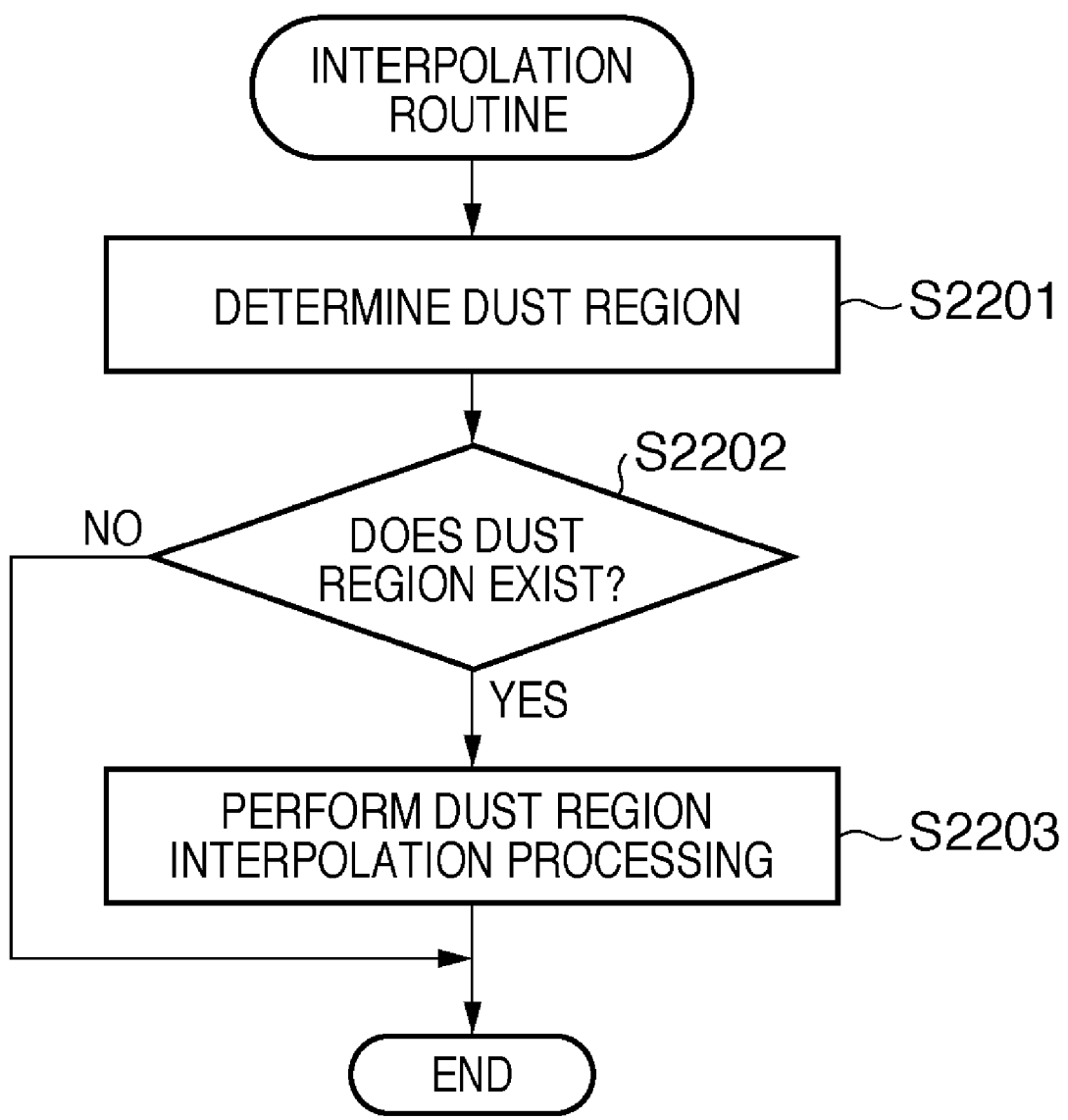
FIG. 22 is a flowchart for explaining details of an interpolation routine in the first embodiment.

Details of the dust region interpolation processing will be explained. FIG. 22 is a flowchart showing the sequence of an interpolation routine. In step S2201, a dust region is determined. The dust region is defined as a region which satisfies all the following conditions:

(1) a region which is darker than that of a threshold value T2 calculated based on an average luminance Yave and maximum luminance Ymax of pixels falling in a region defined by the center coordinates Di' and radius Ri' calculated in step S2002 of FIG. 20 (Di' and Ri' calculated by equation (1)):

$$T2 = Yave \times 0.6 + Ymax \times 0.4$$

(2) a region which does not contact a circle having the radius Ri' from the center coordinates Di'.

(3) a region whose radius value calculated by the same method as that in step S1306 of FIG. 13 is equal to or larger than X1 pixels and smaller than X2 pixels with respect to an isolated region of low-luminance pixels selected in (1).

(4) a region containing the center coordinates Di of the circle.

In the embodiment, X1 represents three pixels, and X2 represents 30 pixels. This setting allows handling only a small isolated region as a dust region. When no lens pupil position can be accurately acquired, condition (4) may be eased. For example, when the region of interest contains the coordinates of a range of ±3 pixels from the coordinates Di in both the X and Y directions, it is determined as a dust region.

If such a region exists in step S2202, the process advances to step S2203 to perform dust region interpolation. If no such region exists, the process ends. The dust region interpolation processing in step S2203 adopts a known defective region interpolation method. An example of the known defective region interpolation method is pattern replacement disclosed in Japanese Patent Laid-Open No. 2001-223894. In Japanese Patent Laid-Open No. 2001-223894, a defective region is specified using infrared light. In the embodiment, a dust region detected in step S2201 is handled as a defective region, and interpolated by pattern replacement using normal neighboring pixels. For a pixel which cannot be interpolated by pattern replacement, p normal pixels are selected sequentially from one closest to the pixel to be interpolated in image data having undergone pattern interpolation, and the target pixel is interpolated using the average color of them.

The sequence of the dust region interpolation processing has been explained.

As described above, the first embodiment can increase the operating speed and reduce the amount of a resource such as a memory used by dust correction processing when playing back a moving image file such as an MP4 file while performing dust correction processing using dust information. The first embodiment allows a user to play back a high-quality moving image in which the shadow of conspicuous dust or the like is corrected.

Second Embodiment

The arrangement of a main part of an image processing apparatus in the second embodiment of the present invention is basically the same as that in FIG. 17. A description of the same arrangement will not be repeated, and only a difference will be explained briefly.

Figure 23:
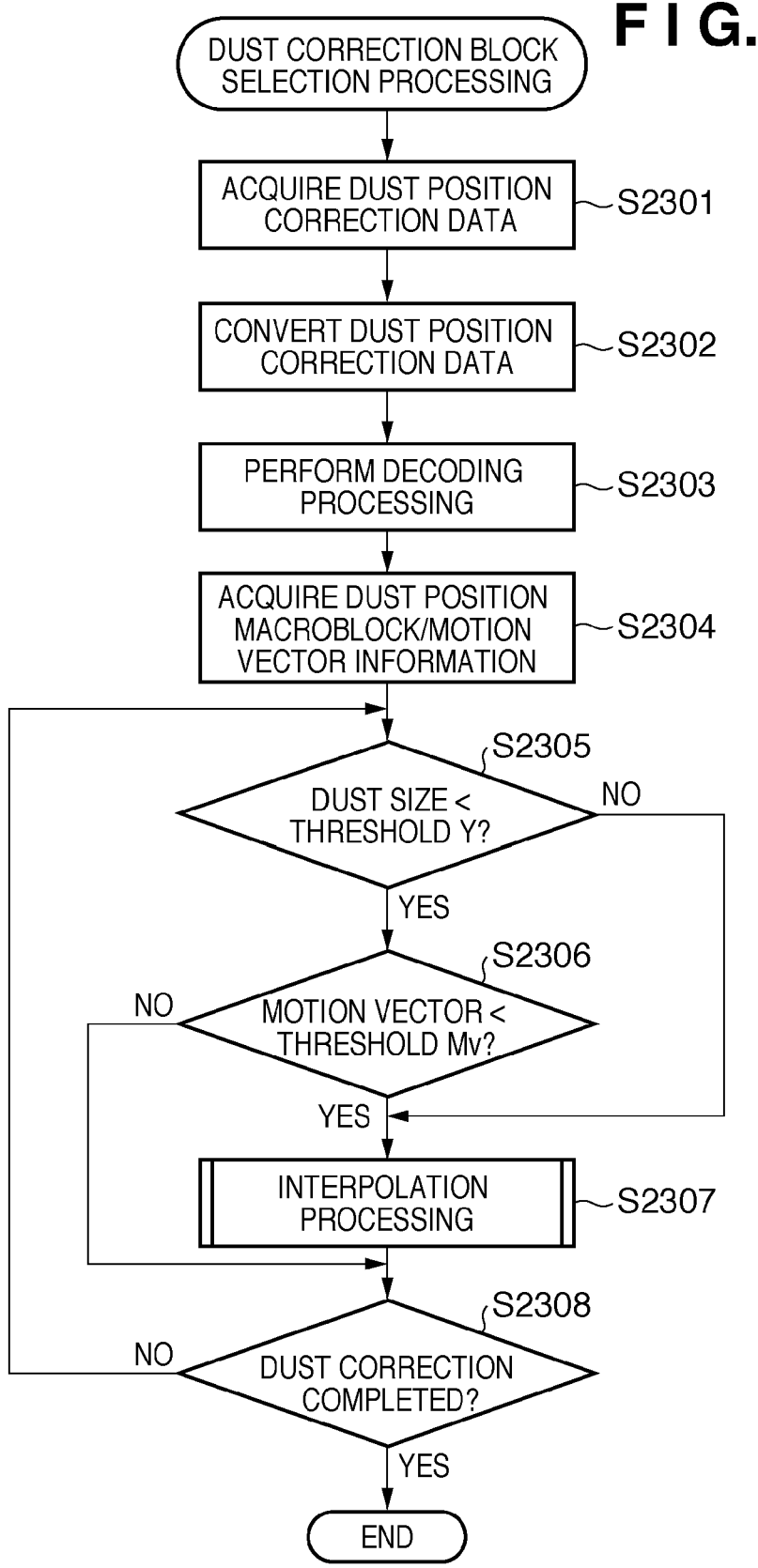
FIG. 23 is a flowchart for explaining details of dust correction block selection processing in the second embodiment of the present invention.

FIG. 23 shows dust correction block selection processing in the second embodiment, which is different from the first embodiment.

Dust position correction data is extracted from moov or moof containing a selected frame (step S2301). The size of dust is acquired by the same method as that in the first embodiment (step S2302). Decoding processing is done in step S2303 similarly to the first embodiment, and dust position macroblock/motion vector information acquisition processing is executed in step S2304.

In step S2305, it is determined whether the dust size acquired in steps S2301 and S2302 is smaller than a predetermined threshold Y. The threshold Y may be statically determined, or dynamically selected depending on the playback operation environment. Needless to say, the user may set an arbitrary value.

The shadow of large dust stands out. Thus, by determining whether the dust size is smaller than the threshold Y, it can be determined whether the dust needs to undergo dust correction.

If it is determined that the dust size is smaller than the threshold Y, the process advances to step S2306. Similar to the first embodiment, whether to execute dust correction is determined based on the motion vector of a macroblock matching the dust position. Details of the dust correction are the same as those in the first embodiment, and a description thereof will not be repeated.

If it is determined in step S2305 that the dust size is equal to or larger than the threshold Y and the dust needs to undergo dust correction, interpolation processing is applied to the dust on the macroblock in step S2307, as needed, regardless of the magnitude of the motion vector. The interpolation processing has already been explained in the first embodiment, and a description thereof will not be repeated.

As described above, when dust has a predetermined size or larger, at least the dust undergoes dust correction regardless of the motion vector of a macroblock matching the dust position. The second embodiment can increase the operating speed and reduce the amount of a resource such as a memory used by dust correction processing when playing back a moving image file such as an MP4 file while performing dust correction processing using dust information. The second embodiment allows a user to play back a high-quality moving image in which the shadow of conspicuous dust or the like is corrected.

Third Embodiment

The arrangement of a main part of an image processing apparatus in the third embodiment of the present invention is basically the same as that in FIG. 17. A description of the same arrangement will not be repeated, and only a difference will be explained briefly.

Dust correction block selection processing in the third embodiment is very similar to that in the second embodiment, and a difference will be briefly explained with reference to FIG. 24.

Figure 24:
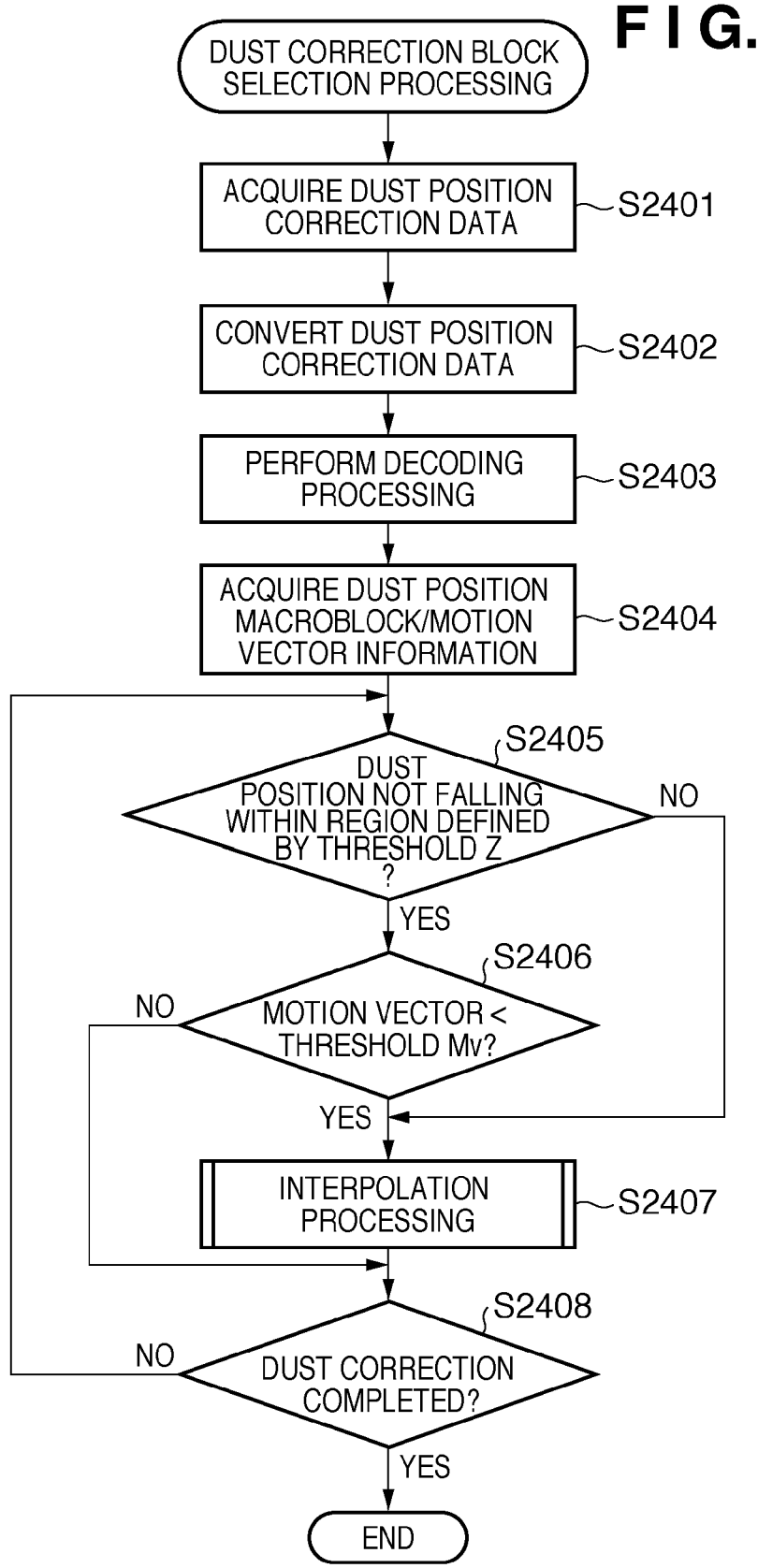
FIG. 24 is a flowchart for explaining details of dust correction block selection processing in the third embodiment of the present invention.

FIG. 24 shows the dust correction block selection processing in the third embodiment, which is different from the first and second embodiments.

In the second embodiment, the dust size is acquired in steps S2301 and S2302. In the third embodiment, the dust position is acquired in steps S2401 and S2402 by the same method as that in steps S2301 and S2302.

Decoding processing is done in step S2403 similarly to the first and second embodiments, and dust position macroblock/motion vector information acquisition processing is executed in step S2404.

In step S2405, the dust position acquired in steps S2401 and S2402 is compared with a predetermined threshold Z. The threshold Z is a value expressing a region based on position information. It is determined whether the acquired dust position falls within a region defined by the threshold Z. The threshold Z may be statically determined, or dynamically selected depending on the playback operation environment. Needless to say, the user may set an arbitrary value.

When dust exists at the center or a position attracting attention of the user, the shadow of the dust stands out. For this reason, the value of the threshold Z is set to information of the center of the frame or a position of interest. By determining whether the dust position falls within a region defined by the threshold Z, it can be determined whether the dust needs to undergo dust correction. Note that the threshold Z is also effective for enlargement display.

If it is determined that the dust does not fall within the region defined by the threshold Z, the process advances to step S2406. Similar to the first and second embodiments, whether to execute dust correction is determined based on the motion vector of a macroblock matching the dust position. Details of the dust correction have already been described, and a description thereof will not be repeated.

If it is determined in step S2405 that the dust falls within the region defined by the threshold Z and needs to undergo dust correction, interpolation processing is applied to the dust on the macroblock in step S2407, as needed, regardless of the magnitude of the motion vector. The interpolation processing has already been explained in the first and second embodiments, and a description thereof will not be repeated.

As described above, when dust falls within a designated region, at least the dust undergoes dust correction regardless of the frame data size. The third embodiment can increase the operating speed and reduce the amount of a resource such as a memory used by dust correction processing when playing back a moving image file such as an MP4 file while performing dust correction processing using dust information. The third embodiment allows a user to play back a high-quality moving image in which the shadow of conspicuous dust or the like is corrected.

Fourth Embodiment

The arrangement of a main part of an image processing apparatus in the fourth embodiment of the present invention is basically the same as that in FIG. 17. A description of the same arrangement will not be repeated, and only a difference will be explained briefly.

Figure 25:
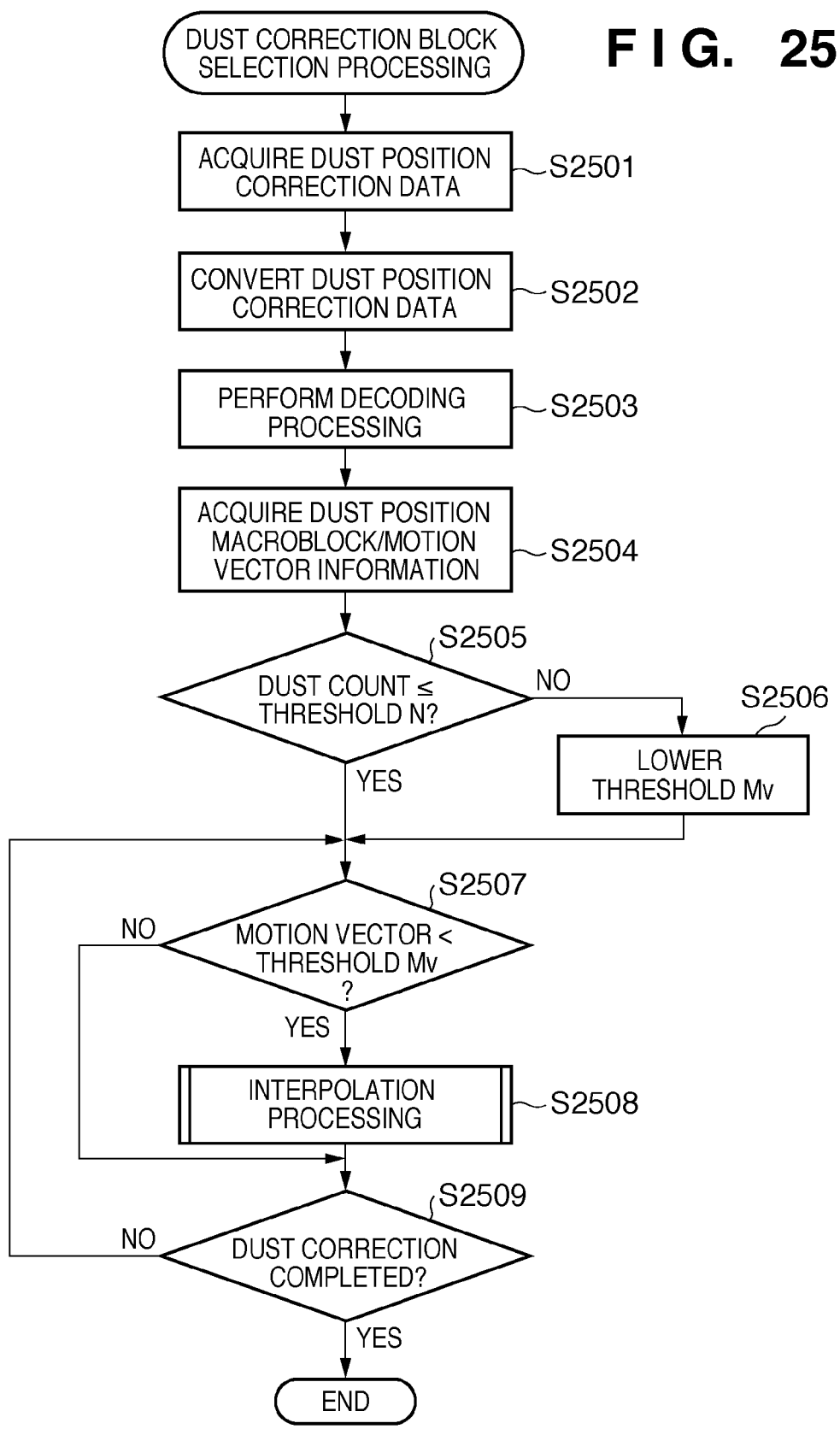
FIG. 25 is a flowchart for explaining details of dust correction block selection processing in the fourth embodiment of the present invention.

FIG. 25 shows dust correction block selection processing in the fourth embodiment, which is different from the first to third embodiments.

In the second embodiment, the dust size is acquired in steps S2301 and S2302. In the fourth embodiment, the dust count is acquired in steps S2501 and S2502 by the same method as that in steps S2301 and S2302.

Decoding processing is done in step S2503 similarly to the first to third embodiments, and dust position macroblock/motion vector information acquisition processing is executed in step S2504.

In step S2505, the dust count acquired in steps S2501 and S2502 is compared with a predetermined threshold N. The threshold N may be statically determined, or dynamically selected depending on the playback operation environment. Needless to say, the user may set an arbitrary value.

If the dust count is equal to or smaller than the threshold N, the process directly advances to step S2507. Similar to the first to third embodiments, whether to execute dust correction is determined based on the motion vector of a macroblock matching the dust position. Details of the dust correction have already been described, and a description thereof will not be repeated.

If it is determined that the dust count is larger than the threshold N, the threshold Mv is lowered (determination criterion is changed) in step S2506. The lowered value is arbitrary and may be managed by a table or the like. More specifically, the lowered Mv is 5 when the dust count is 100 (inclusive) to 200 (exclusive), and 10 when the dust count is 200 (inclusive) to 300 (exclusive). The subsequence processing is the same as that in the first embodiment, and a description thereof will not be repeated.

A larger dust count requires dust correction processing and a larger memory amount used by the dust correction processing. Considering this, the threshold Mv is changed depending on the dust count. The fourth embodiment can increase the operating speed and reduce the amount of a resource such as a memory used by dust correction processing. The fourth embodiment allows a user to play back a high-quality moving image in which the shadow of conspicuous dust or the like is corrected.

Fifth Embodiment

In the first to fourth embodiments, a separately prepared image processing apparatus executes dust correction playback processing. Alternatively, a similar image processing apparatus may be arranged in an image capturing apparatus to perform the same processing. Also in this case, the image capturing apparatus can play back a moving image file such as an MP4 file while performing dust correction processing using dust information. The fifth embodiment can increase the operating speed and reduce the amount of a resource such as a memory used by dust correction processing. The fifth embodiment allows a user to play back a high-quality moving image in which the shadow of conspicuous dust or the like is corrected.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-244943, filed Sep. 24, 2008, which is hereby incorporated by reference herein in its entirety.

What is claimed is:

1. An image processing apparatus comprising:
a foreign substance information acquisition unit which acquires, from input moving image data, foreign substance information containing a position and size of a foreign substance adhering to an optical element arranged in front of an image sensor in an image capturing apparatus that captures the moving image data;
a motion vector information acquisition unit which acquires, from the moving image data, a motion vector of a macroblock obtained by dividing the moving image data;
a correction unit which corrects deterioration of image quality caused by the foreign substance, based on the foreign substance information acquired by said foreign substance information acquisition unit, and
a determination unit which determines, based on a motion vector of a macroblock including the position of the foreign substance in the moving image data, whether to perform foreign substance correction of the macroblock.

2. The apparatus according to claim 1, wherein when the size of the foreign substance is not smaller than a predetermined size in the foreign substance information acquired by said foreign substance information acquisition unit, said determination unit determines to perform foreign substance correction of the macroblock regardless of the motion vector of the macroblock.

3. The apparatus according to claim 1, wherein when the foreign substance falls within a designated area in the foreign substance information acquired by said foreign substance information acquisition unit, said determination unit determines to perform foreign substance correction of the macroblock regardless of the motion vector of the macroblock.

4. The apparatus according to claim 1, wherein when a count of the foreign substance is larger than a predetermined count in the foreign substance information acquired by said foreign substance information acquisition unit, said determination unit changes a criterion to determine whether to perform foreign substance correction of the macroblock.

5. An image processing method comprising:
a foreign substance acquisition step of acquiring, from input moving image data, foreign substance information containing a position and size of a foreign substance adhering to an optical element arranged in front of an image sensor in an image capturing apparatus that captures the moving image data;
a motion vector information acquisition step of acquiring, from the moving image data, a motion vector of a macroblock obtained by dividing the moving image data;
a correction step of correcting deterioration of image quality caused by the foreign substance, based on the foreign substance information acquired in the foreign substance acquisition step; and
a determination step of determining, based on a motion vector of a macroblock including the position of the foreign substance in the moving image data, whether to perform foreign substance correction playback of the macroblock.

6. A non-transitory computer readable storage medium storing a program for causing a computer to execute an image processing method defined in claim 5.

7. The apparatus according to claim 1, wherein when the motion vector of the macroblock including the position of the foreign substance is smaller than a predetermined value, said determination unit determines to perform foreign substance correction of the macroblock, and
wherein when the motion vector of the macroblock including the position of the foreign substance is not smaller than a predetermined value, said determination unit determines not to perform foreign substance correction of the macroblock.

8. An image processing apparatus comprising:
a foreign substance information acquisition unit which acquires, from input moving image data, foreign substance information containing a position and size of a foreign substance adhering to an optical element arranged in front of an image sensor in an image capturing apparatus that captures the moving image data;
a motion vector information acquisition unit which acquires a motion vector of a region obtained by dividing the moving image data;
a correction unit which corrects deterioration of image quality caused by the foreign substance in accordance with the foreign substance information acquired by said foreign substance information acquisition unit; and
a determination unit which determines whether to perform foreign substance correction of a region including the position of the foreign substance in accordance with a motion vector of the region.

9. The apparatus according to claim 8, wherein when the motion vector of the region including the position of the foreign substance is smaller than a predetermined value, said determination unit determines to perform foreign substance correction of the region, and
wherein when the motion vector of the region including the position of the foreign substance is not smaller than a predetermined value, said determination unit determines not to perform foreign substance correction of the region.

10. The apparatus according to claim 8, wherein when the size of the foreign substance is not smaller than a predetermined size in the foreign substance information acquired by said foreign substance information acquisition unit, said determination unit determines to perform foreign substance correction of the region regardless of the motion vector of the region.

11. The apparatus according to claim 8, wherein when the foreign substance falls within a designated area in the foreign substance information acquired by said foreign substance information acquisition unit, said determination unit determines to perform foreign substance correction of the region regardless of the motion vector of the region.

12. The apparatus according to claim 8, wherein when a count of the foreign substance is larger than a predetermined count in the foreign substance information acquired by said foreign substance information acquisition unit, said determination unit changes a criterion to determine whether to perform foreign substance correction of the region.

13. An image processing method comprising:
- a foreign substance acquisition step of acquiring, from input moving image data, foreign substance information containing a position and size of a foreign substance adhering to an optical element arranged in front of an image sensor in an image capturing apparatus that captures the moving image data;
- a motion vector information acquisition step of acquiring, from the moving image data, a motion vector of a region obtained by dividing the moving image data;
- a correction step of correcting deterioration of image quality caused by the foreign substance in accordance with the foreign substance information acquired in the foreign substance acquisition step; and
- a determination step of determining whether to perform foreign substance correction of a region including the position of the foreign substance in accordance with a motion vector of the region.

14. A non-transitory computer readable storage medium storing a program for causing a computer to execute an image processing method defined in claim 13.

15. An image processing apparatus comprising:
- a foreign substance information acquisition unit which acquires, from input moving image data, foreign substance information containing a position and size of a foreign substance adhering to an optical element arranged in front of an image sensor in an image capturing apparatus that captures the moving image data;
- a motion vector information acquisition unit which acquires a motion vector of a region obtained by dividing the moving image data; and
- a correction unit which performs foreign substance correction in accordance with the foreign substance information acquired by said foreign substance information acquisition unit,
- wherein when the motion vector of the region including the position of the foreign substance is smaller than a predetermined value, said correction unit performs foreign substance correction of the region, and
- wherein when the motion vector of the region including the position of the foreign substance is not smaller than the predetermined value, said correction unit does not perform foreign substance correction of the region.

16. The apparatus according to claim 15, wherein when the size of the foreign substance is not smaller than a predetermined size in the foreign substance information acquired by said foreign substance information acquisition unit, said correction unit performs foreign substance correction of the region regardless of the motion vector of the region.

17. The apparatus according to claim 15, wherein when the foreign substance falls within a designated area in the foreign substance information acquired by said foreign substance information acquisition unit, said correction unit performs foreign substance correction of the region regardless of the motion vector of the region.

18. The apparatus according to claim 15, wherein when a count of the foreign substance is larger than a predetermined count in the foreign substance information acquired by said foreign substance information acquisition unit, the predetermined value is changed.

19. An image processing method comprising:
- a foreign substance acquisition step of acquiring, from input moving image data, foreign substance information containing a position and size of a foreign substance adhering to an optical element arranged in front of an image sensor in an image capturing apparatus that captures the moving image data;
- a motion vector information acquisition step of acquiring, from the moving image data, a motion vector of a region obtained by dividing the moving image data; and
- a correction step of performing foreign substance correction in accordance with the foreign substance information acquired in the foreign substance acquisition step;
- wherein when the motion vector of the region including the position of the foreign substance is smaller than a predetermined value, the foreign substance correction of the region is performed, and
- wherein when the motion vector of the region including the position of the foreign substance is not smaller than the predetermined value, the foreign substance correction of the region is not performed.

20. A non-transitory computer readable storage medium storing a program for causing a computer to execute an image processing method defined in claim 19.

* * * * *